United States Patent
Nakada

(10) Patent No.: US 8,948,997 B2
(45) Date of Patent: Feb. 3, 2015

(54) CONTROL DEVICE FOR INTERNAL COMBUSTION ENGINE

(75) Inventor: Hayato Nakada, Minamitsuru-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 334 days.

(21) Appl. No.: 13/519,052

(22) PCT Filed: Jan. 18, 2010

(86) PCT No.: PCT/JP2010/050861
§ 371 (c)(1),
(2), (4) Date: Jun. 25, 2012

(87) PCT Pub. No.: WO2011/086708
PCT Pub. Date: Jul. 21, 2011

(65) Prior Publication Data
US 2012/0277975 A1  Nov. 1, 2012

(51) Int. Cl.
*F02D 41/00* (2006.01)
*F02M 25/07* (2006.01)
(Continued)

(52) U.S. Cl.
CPC .......... *F02D 41/0007* (2013.01); *F02D 41/005* (2013.01); *F02M 25/0707* (2013.01); *F02M 25/0713* (2013.01); *F02B 29/0406* (2013.01); *F02M 25/0727* (2013.01); *Y02T 10/144* (2013.01); *Y02T 10/47* (2013.01); *F02D 2041/1433* (2013.01)
USPC ........................................... 701/102; 701/108

(58) Field of Classification Search
CPC .. F02D 41/005; F02D 41/0007; F02M 25/07; F02M 25/0713

USPC ............ 701/102, 103, 108; 123/559.1, 559.2, 123/561, 564, 565, 568.21
See application file for complete search history.

(56) References Cited

U.S. PATENT DOCUMENTS

2005/0178123 A1  8/2005  Uchiyama et al.
2005/0192681 A1  9/2005  Matsunaga et al.
(Continued)

FOREIGN PATENT DOCUMENTS

EP         1 571 321 A2    9/2005
EP         1 750 183 A1    2/2007
(Continued)

OTHER PUBLICATIONS

International Search Report issued in Application No. PCT/JP2010/050861; Dated Mar. 23, 2010 (With Translation).

*Primary Examiner* — Mahmoud Gimie
(74) *Attorney, Agent, or Firm* — Oliff PLC

(57) ABSTRACT

In the case where a constraint condition related to an internal combustion engine is satisfied when a control amount of each of the control objects 35d, 52 is controlled in accordance with the operation amount determined based on initial target values TPcom and TRegr of respective control objects of an internal combustion engine 10, the control amount of each of the control objects is controlled in accordance with the operation amount determined based on the initial target values. In the case where the constraint condition is not satisfied, the initial target values are repeatedly corrected in accordance with a predetermined rule so as to satisfy the constraint condition, and the control amount of each of the control objects is controlled in accordance with the operation amount determined based on the corrected initial target values.

27 Claims, 4 Drawing Sheets

(51) Int. Cl.
*F02B 29/04* (2006.01)
*F02D 41/14* (2006.01)

(56) References Cited

U.S. PATENT DOCUMENTS

2006/0137347 A1 6/2006 Stewart et al.
2007/0198163 A1 8/2007 Yasui et al.

FOREIGN PATENT DOCUMENTS

| EP | 2 085 593 A1 | 8/2009 |
|---|---|---|
| JP | A-08-196744 | 8/1996 |
| JP | A-2001-193572 | 7/2001 |
| JP | A-2002-273045 | 9/2002 |
| JP | A-2005-233033 | 9/2005 |
| JP | A-2005-264805 | 9/2005 |
| JP | A-2005-276169 | 10/2005 |
| JP | A-2005-299424 | 10/2005 |
| JP | A-2005-301764 | 10/2005 |
| JP | 2009024550 A * | 2/2009 |
| JP | A-2009-180217 | 8/2009 |
| JP | A-2010-013992 | 1/2010 |
| WO | WO 2005/098554 A1 | 10/2005 |

* cited by examiner

CONTROL DEVICE FOR INTERNAL COMBUSTION ENGINE

TECHNICAL FIELD

The present invention relates to a control device for an internal combustion engine.

BACKGROUND ART

Patent Document 1 discloses a temperature control device which controls a temperature of a heating plate having a semiconductor wafer mounted thereon. In the temperature control device, the heating plate is heated by a heater, so that the semiconductor wafer mounted on the heating plate is heated. Then, the temperature control device controls the heating operation of the heater so that the temperature of the heating plate becomes a target temperature.

Incidentally, in the temperature control device disclosed in Patent Document 1, when the heating plate is influenced by disturbance, the temperature of the heating plate becomes higher or lower than the target temperature (hereinafter, the target temperature will be referred to as an 'initial target temperature'). That is, when the heating plate is influenced by disturbance, the temperature of the heating plate changes.

Here, if the target temperature of the heating plate temporarily becomes lower than the initial target temperature when the temperature of the heating plate is about to become higher than the initial target temperature, the amount of heat given from the heater to the heating plate decreases, thereby suppressing the temperature of the heating plate from becoming higher than the initial target temperature. In contrast, if the target temperature of the heating plate temporarily becomes higher than the initial target temperature when the temperature of the heating plate is about to become lower than the initial target temperature, the amount of heat given from the heater to the heating plate increases, thereby suppressing the temperature of the heating plate from becoming lower than the initial target temperature. Accordingly, when the target temperature of the heating plate changes in a manner opposite to a change in temperature which may occur in the case where the target temperature of the heating plate is maintained at the initial target temperature when the heating plate is influenced by disturbance, the temperature of the heating plate is maintained at the initial target temperature even when the heating plate is influenced by disturbance.

Therefore, in the device disclosed in Patent Document 1, disturbance is forcedly given to the heating plate in a state where the temperature of the heating plate is controlled at the initial target temperature, and the temperature change pattern of the heating plate at this time is measured. Then, the temperature change pattern opposite to the temperature change pattern of the heating plate at this time is acquired as the target temperature change pattern of the heating plate when the heating plate is influenced by the disturbance. Then, when the heating plate is influenced by the disturbance similar to the above-described disturbance, the target temperature of the heating plate is changed in accordance with the acquired target temperature change pattern, and the temperature of the heating plate is maintained at the initial target temperature.

In this way, Patent Document 1 discloses a concept in which the temperature of the heating plate is maintained at the initial target temperature by changing the target temperature of the heating plate itself in accordance with the target temperature change pattern when the heating plate is influenced by disturbance.

CITATION LIST

Patent Document 1: JP2005-276169A

SUMMARY OF INVENTION

1. Technical Problem

Incidentally, in the temperature control device disclosed in Patent Document 1, there is a need to acquire the target temperature change pattern of the heating plate corresponding to all types of disturbance in order to maintain the temperature of the heating plate so as to be appropriately controlled at the initial target temperature even when the heating plate is influenced by a certain type of disturbance. However, the type of disturbance influencing the heating plate is various. For this reason, the target temperature change pattern of the heating plate to be acquired is also various. In consideration of this, it is not substantially possible to acquire the target temperature change pattern of the heating plate corresponding to all types of disturbance. Despite this, when the target temperature change pattern of the heating plate corresponding to all types of disturbance needs to be acquired, much effort needs to be spent for acquiring the target temperature change pattern of the heating plate, and a large-capacity memory is also needed to store the acquired various target temperature change patterns of the heating plate. However, when the target temperature change pattern of the heating plate corresponding to all types of disturbance is not acquired, it is certain that the temperature of the heating plate may not be maintained so as to be appropriately controlled at the initial target temperature when the heating plate is influenced by the disturbance corresponding to the target temperature change pattern which is not acquired in the heating plate.

Anyway, in the temperature control device disclosed in Patent Document 1, even when the temperature of the heating plate needs to be maintained at the initial target temperature when the heating plate is influenced by disturbance, it is difficult to maintain the temperature of the heating plate so as to be appropriately controlled at the initial target temperature. According to the more general expression, in the concept disclosed in Patent Document 1, even when the control amount of the control object needs to be maintained at the initial target value when the control object is influenced by disturbance, it is difficult to maintain the control amount of the control object so as to be appropriately controlled at the initial target value.

Further, in the temperature control device disclosed in Patent Document 1, when the initial target temperature of the heating plate is changed, it is desirable to appropriately control the temperature of the heating plate at the changed initial target temperature. Here, in the case where the concept disclosed in Patent Document 1 is applied to the control of the temperature of the heating plate when the initial target temperature of the heating plate is changed, for example, the target temperature change pattern in accordance with the changed initial target temperature is acquired in advance, and the target temperature of the heating plate is changed in accordance with the target temperature change pattern corresponding to the changed initial target temperature when the initial target temperature of the heating plate is changed. However, it is difficult to appropriately control the temperature of the heating plate at the changed initial target temperature based on such a method due to the reasons similar to the above-described reasons. According to the more general expression, in the concept disclosed in Patent Document 1, even when the temperature of the heating plate is desired to be controlled at the changed initial target temperature when the initial target temperature of the heating plate is changed, it is difficult to appropriately control the temperature of the heating plate at the initial target temperature.

Further, in the temperature control device disclosed in Patent Document 1, when the heating plate is influenced by disturbance and the temperature of the heating plate is controlled based on the target temperature changeable in accordance with the target temperature change pattern corresponding to the disturbance, the temperature of the heating plate may not be maintained so as to be appropriately controlled at the initial target temperature in accordance with the entire state of the system including the heating plate (hereinafter, the system will be referred to as a 'heating system'), and it is difficult to mention that the control of the temperature of the heating plate at this time is appropriate for the heating system. Further, in the temperature control device disclosed in Patent Document 1, even when the initial target temperature of the heating plate is changed and the temperature of the heating plate is controlled based on the target temperature changeable in accordance with the target temperature change pattern corresponding to the changed initial target temperature, the temperature of the heating plate may not be appropriately controlled at the changed initial target temperature and the temperature of the heating plate at this time may not be controlled so as to be appropriate for the control of the heating system in accordance with the state of the heating system.

In this way, in the temperature control device disclosed in Patent Document 1, in the case where the temperature of the heating plate is maintained or controlled at the initial target value, the state of the entire system including the heating plate is not considered.

Accordingly, according to the more general expression, in the concept disclosed in Patent Document 1, even when the control amount of the control object is desired to be maintained or controlled at the initial target value, the control amount of the control object is not maintained or controlled so as to be appropriately controlled at the initial target value and the control amount of the control object is not controlled appropriate for the entire system including the control object in accordance with the state of the entire system including the control object.

Further, in the temperature control device disclosed in Patent Document 1, in the case where there is a control object other than the heating plate, that is, there are plural control objects, when the control amount of each control object is desired to be maintained or controlled so as to be appropriately controlled at each initial target value when each control object is influenced by disturbance, the control amount of each control object is not maintained or controlled so as to be appropriately controlled at each initial target value and the control amount of each control object is not controlled so as to be appropriate for the control of the entire system including the control object due to the reasons similar to the above-described reasons.

In this way, from the viewpoint in which the control amount of the control object is maintained or controlled so as to be appropriately controlled at the initial target value and the control amounts of plural control objects are maintained or controlled at the respective target values, the concept disclosed in Patent Document 1 has several problems to be solved. Therefore, it is an object of the invention to maintain or control the control amount of each control object so as to be appropriately controlled at each initial target value when the control amounts of plural control objects are maintained or controlled at the respective initial target values.

2. Solution to Problem

In order to attain the above-described object, a first aspect of the invention provides a control device for an internal combustion engine comprising:

an initial target value determination means for determining a target value of a control amount of a first control object of an internal combustion engine as a first initial target value and determining a target value of a control amount of a second control object of the internal combustion engine as a second initial target value;

an operation amount determination means for determining a first operation amount to be input to the first control object in accordance with a first control target value as a target value for controlling the control amount of the first control object and determining a second operation amount to be input to the second control object in accordance with a second control target value as a target value for controlling the control amount of the second control object;

a first operation control means for controlling the operation of the first control object in accordance with the first operation amount determined by the operation amount determination means; and a second operation control means for controlling the operation of the second control object in accordance with the second operation amount determined by the operation amount determination means, wherein each of the operation control means controls the operation of the corresponding control object, thereby the control amount of each of the control objects is controlled, wherein the control device for an internal combustion engine further comprises a correction target value output means for correcting the first initial target value and the second initial target value in accordance with a predetermined rule and outputting the respective corrected initial target values as a first correction target value and a second correction target value, wherein in the case where a constraint condition related to the internal combustion engine is satisfied when the control amount of the first control object and the control amount of the second control object are controlled in accordance with the first operation amount and the second operation amount determined by the operation amount determination means by using the first initial target value and the second initial target value respectively as the first control target value and the second control target value, the first initial target value and the second initial target value are respectively input as the first control target value and the second control target value to the operation amount determination means, and wherein in the case where a constraint condition related to the internal combustion engine is not satisfied when the control amount of the first control object and the control amount of the second control object are controlled in accordance with the first operation amount and the second operation amount determined by the operation amount determination means by using the first initial target value and the second initial target value respectively as the first control target value and the second control target value, the first initial target value and the second initial target value are repeatedly corrected in accordance with the predetermined rule by the correction target value output means so as to satisfy the constraint condition, the corrected initial target values are respectively output as a first correction target value and a second correction target value, and the first correction target value and the second correction target value output therefrom are respectively input as the first control target value and the second control target value to the operation amount determination means.

According to the invention, in the case where the constraint condition related to the internal combustion engine is satisfied when the control amount of each control object is controlled in accordance with the operation amount in which the initial target value is set as the control target value, the initial target value becomes the control target value. On the other hand, in the case where the constraint condition related to the internal combustion engine is not satisfied when the control amount of each control object is controlled in accordance with the operation amount in which the initial target value is determined as the control target value, the initial target value is repeatedly corrected in accordance with the predetermined rule until the constraint condition related to the internal combustion engine is satisfied, the corrected initial target value is output as the correction target value, and the output correction target value becomes the control target value. That is, the invention employs a configuration in which the initial target value is corrected by repeatedly using the specific predetermined rule so that the constraint condition related to the internal combustion engine is satisfied instead of a configuration in which the correction pattern for correcting the initial target value is acquired in advance for each situation so that the constraint condition related to the internal combustion engine is satisfied (that is, the control amount of each control object is appropriately controlled in accordance with the state of the internal combustion engine) in any situation and the initial target value is corrected by using the acquired correction pattern. In this way, according to the invention, since the initial target value is corrected by using the specific predetermined rule instead of the correction pattern acquired in advance for each situation, in the case where the control amount of each control object is maintained at a constant initial target value (that is, the control amount of each control object is controlled in a normal state), the control amount of each control object is maintained at the initial target value according to the appropriate control method (that is, in a state where the constraint condition related to the internal combustion engine is satisfied) during a process in which the control amount of each control object is maintained at a constant initial target value. In the case where the initial target value is changed and the control amount of each control object is controlled at the changed initial target value (that is, the control amount of each control object is controlled in a transient state), the control amount of each control object is controlled at the changed initial target value according to the appropriate control method (that is, in a state where the constraint condition related to the internal combustion engine is satisfied) during a process in which the control amount of each control object is controlled at the changed initial target value.

Further, according to the invention, in the case where the constraint condition related to the internal combustion engine is satisfied when the control amount of each control object is controlled in accordance with the operation amount in which the initial target value is determined as the control target value, the initial target value becomes the control target value. In the case where the constraint condition related to the internal combustion engine is not satisfied when the control amount of each control object is controlled in accordance with the operation amount in which the initial target value is determined as the control target value, the initial target value corrected so as to satisfy the constraint condition related to the internal combustion engine becomes the control target value. Accordingly, the control amount of each control object is controlled in a state where the constraint condition related to the internal combustion engine is satisfied in the control of the control amounts of both control objects. For this reason, even when there is interference in the control of the control amounts of respective control objects, the control amount of each control object is maintained or controlled at the initial target value in a state where the constraint condition related to the internal combustion engine is satisfied (that is, the control is appropriately performed in accordance with the state of the internal combustion engine).

Further, in order to attain the above-described object, a second aspect of the invention provides the control device for the internal combustion engine according to the first aspect of the invention, further comprising:

an estimation means for estimating the state of the internal combustion engine when the control amount of each of the control objects is controlled in accordance with the first operation amount and the second operation amount determined by the operation amount determination means by using the first initial target value and the second initial target value respectively as the first control target value and the second control target value, wherein the first initial target value and the second initial target value are corrected by the correction target value output means so that the constraint condition is satisfied based on the state of the internal combustion engine estimated by the estimation means.

According to the invention, the state of the internal combustion engine is estimated when the control amount of each control object is controlled by using the initial target value as the control target value before the control of the control amount of each control object is actually started after the initial target value is determined. Then, it is determined whether the constraint condition related to the internal combustion engine is satisfied based on the estimated state of the internal combustion engine. When it is determined that the constraint condition is satisfied, the initial target value is set as the control target value. When it is determined that the constraint condition is not satisfied, the initial target value is corrected so as to satisfy the constraint condition and the corrected initial target value is set as the control target value of the control amount of each control object. Then, the control of the control amount of each control object is actually started based on the control target value set in this way. For this reason, the control amount of each control object is maintained or controlled at the initial target value so as to be reliably appropriate for the state of the internal combustion engine.

Further, in order to attain the above-described object, a third aspect of the invention provides the control device for the internal combustion engine according to the second aspect of the invention, wherein the estimation means estimates the state of the internal combustion engine when the control amount of each of the control objects is controlled in accordance with the first operation amount and the second operation amount determined by the operation amount determination means by using the first initial target value and the second initial target value respectively as the first control target value and the second control target value by a state space model related to the internal combustion engine.

In the invention, the state space model related to the internal combustion engine includes the internal state of the internal combustion engine as a variable. Accordingly, according to the invention, the state of the internal combustion engine is estimated in a state where the internal state of the internal combustion engine is accurately reflected. For this reason, the control amount of each control object is maintained or controlled at the initial target value so as to be more appropriate for the state of the internal combustion engine.

Further, in order to attain the above-described object, a fourth aspect of the invention provides the control device for the internal combustion engine according to any one of the first to third aspects of the invention, wherein the constraint condition is indicated by a bounded closed set, the internal state of the internal combustion engine related to the constraint condition is indicated by a vector, and it is determined that the constraint condition is satisfied when the vector is included in the bounded closed set.

According to the invention, it is determined whether the constraint condition is satisfied by using the closed set indicating the constraint condition and the vector indicating the internal state of the internal combustion engine related to the constraint condition. For this reason, it is easily and reliably determined whether the constraint condition is satisfied.

Further, in order to attain the above-described object, a fifth aspect of the invention provides the control device for the internal combustion engine according to any one of the first to fourth aspects of the invention, wherein the first initial target value and the second initial target value are corrected by the correction target value output means so that the first correction target value becomes a value closest to the first initial target value and the second correction target value becomes a value closest to the second initial target value.

According to the invention, even when the initial target value is corrected by the correction target value output means, the corrected initial target value, that is, the correction target value becomes a value closest to the corresponding initial target value. Accordingly, the control amount of each control object is controlled based on the correction target value which is a value closest to the initial target value. For this reason, from the viewpoint in which the control amount of each control object is promptly maintained or controlled at the initial target value and the viewpoint in which a large change in the control amount of each control object caused by the correction of the initial target value is suppressed, it may be understood that the control amount of each control object is maintained or controlled at the initial target value so as to be reliably appropriate for the state of the internal combustion engine.

In order to attain the above-described object, a sixth aspect of the invention provides the control device for the internal combustion engine according to any one of the first to fifth aspects of the invention, wherein the constraint condition includes:

at least one of a constraint condition related to the control amount of the first control object, a constraint condition related to the first control object, a constraint condition related to the first operation amount to be input to the first control object, and a constraint condition related to the first operation control means; and at least one of a constraint condition related to the control amount of the second control object, a constraint condition related to the second control object, a constraint condition related to the second operation amount to be input to the second control object, and a constraint condition related to the second operation control means.

According to the invention, in a state where both of the constraint condition related to the control amount of the first control object (that is, the constraint condition related to the control amount of the first control object, the constraint condition related to the first control object, the constraint condition related to the first operation amount to be input to the first control object, or the constraint condition related to the first operation control means) and the constraint condition related to the control amount of the second control object (that is, the constraint condition related to the control amount of the second control object, the constraint condition related to the second control object, the constraint condition related to the second operation amount to be input to the second control object, or the constraint condition related to the second operation control means) are satisfied, the control related to the control amount of the first control object (that is, the control of the control amount of the first control object, the control of the operation of the first control object, the determination of the first operation amount, or the control of the operation of the first operation control means) and the control related to the control amount of the second control object (that is, the control of the control amount of the second control object, the control of the operation of the second control object, the determination of the second operation amount, or the control of the operation of the second operation control means) are performed. Accordingly, even when there is interference between the control related to the control amount of the first control object and the control related to the control amount of the second control object, the control amount of each control object is maintained or controlled at the initial target value so as to be appropriate for each concerned control.

Further, in order to attain the above-described object, a seventh aspect of the invention provides the control device for the internal combustion engine according to the sixth aspect of the invention, wherein the constraint condition related to the control amount of the first control object is that the control amount of the first control object is in a predetermined allowable range, the constraint condition related to the first control object is that the operation state of the first control object is in a predetermined allowable range, the constraint condition related to the first operation amount to be input to the first control object is that the first operation amount is in a predetermined allowable range, the constraint condition related to the first operation control means is that the operation state of the first operation control means is in a predetermined allowable range, the constraint condition related to the control amount of the second control object is that the control amount of the second control object is in a predetermined allowable range, the constraint condition related to the second control object is that the operation state of the second control object is in a predetermined allowable range, the constraint condition related to the second operation amount to be input to the second control object is that the second operation amount is in a predetermined allowable range, and the constraint condition related to the second operation control means indicates that the operation state of the second operation control means is in a predetermined allowable range.

In the invention, it is obviously undesirable that the control amount of the control object becomes larger than the allowable range or smaller than the allowable range. Further, it is undesirable that the operation state of each control object exceeds the allowable range in consideration of not only the control object, but also the control of the control amount of the control object. Further, it is undesirable that the operation amount to be input to each control object becomes larger than the allowable range or smaller than the allowable range in consideration of not only the control object, but also the control of the control amount of the control object. Furthermore, it is undesirable that the operation state of each of the operation control means exceeds the allowable range in consideration of not only the operation control means, but also the control of the control amount of the control object and the control object. Here, according to the invention, in a state where the control amount of each control object does not exceed the allowable range, the operation state of each control object does not exceed the allowable range, the operation amount to be input to each control object does not exceed the allowable range, or the operation state of each of the operation control means does not exceed the allowable range, the control amount of each control object is controlled. For this reason, the control amount of each control object is maintained or controlled at the initial target value so as to be more appropriate for the concerned control.

In order to attain the above-described object, an eighth aspect of the invention provides the control device for the internal combustion engine according to the sixth or seventh aspect of the invention, wherein the first initial target value and the second initial target value are corrected by the correction target value output means so as to satisfy all of: the constraint condition related to the control amount of the first control object; the constraint condition related to the first control object; the constraint condition related to the first operation amount to be input to the first control object; the constraint condition related to the first operation control means; the constraint condition related to the control amount of the second control object; the constraint condition related to the second control object; the constraint condition related to the second operation amount to be input to the second control object; and the constraint condition related to the second operation control means.

According to the invention, the control amount of each control object is controlled based on the control target value in which all constraint conditions related to the control amount of the first control object and all constraint conditions related to the control amount of the second control object are satisfied. For this reason, the control amount of each control object is maintained or controlled at the initial target value so as to be appropriate for all controls.

Further, in order to attain the above-described object, a ninth aspect of the invention provides the control device for the internal combustion engine according to any one of the first to eighth aspects of the invention, wherein the first control object is a pressure control valve which controls a degree of increase in a pressure of air brought into a combustion chamber in a supercharger which increases the pressure of the air brought into the combustion chamber of the internal combustion engine, the second control object is an exhaust gas amount control valve which controls an amount of an exhaust gas introduced into an air intake passage in an exhaust recycling device which introduces the exhaust gas discharged from the combustion chamber into the air intake passage of the internal combustion engine so that the exhaust gas discharged from the combustion chamber is brought into the combustion chamber, the control amount of the first control object is the pressure of the air brought into the combustion chamber, the control amount of the second control object is the amount of the exhaust gas introduced into the air intake passage, the first operation control means is a pressure control valve actuator which controls the operation of the pressure control valve, and the second operation control means is an exhaust gas amount control valve actuator which controls the operation of the exhaust gas amount control valve.

In the invention, when the pressure of the air brought into the combustion chamber changes, the amount of the exhaust gas brought into the air intake passage also changes. When the amount of the exhaust gas brought into the air intake passage changes, the amount of the air brought into the combustion chamber also changes. That is, the pressure of the air brought into the combustion chamber and the amount of the exhaust gas brought into the air intake passage are control amounts interfering with each other. Accordingly, the control of the opening degree of the pressure control valve of the supercharger and the control of the opening degree of the exhaust gas amount control valve of the exhaust recycling device may also be controls interfering with each other, the operation amount input to the pressure control valve and the operation amount input to the exhaust gas amount control valve may also be operation amounts interfering with each other, and the control of the pressure control valve actuator and the control of the exhaust gas amount control valve actuator may also be controls interfering with each other. Here, according to the invention, in a state where the constraint condition related to the internal combustion engine is satisfied, the control of the pressure of the air brought into the combustion chamber, the control of the amount of the exhaust gas brought into the air intake passage, the control of the operation of the pressure control valve, the control of the operation of the exhaust gas amount control valve, the determination of the operation amount input to the pressure control valve, the determination of the operation amount input to the exhaust gas amount control valve, the control of the operation of the pressure control valve actuator, and the control of the operation of the exhaust gas amount control valve actuator are performed, where the controls and the determinations interfere with each other. For this reason, the pressure of the air brought into the combustion chamber and the amount of the exhaust gas brought into the air intake passage are maintained or controlled at the respective initial target values so as to be more appropriate for the state of the internal combustion engine.

In order to attain the above-described object, a tenth aspect of the invention provides a control device for an internal combustion engine comprising:

a first control object to be controlled in the internal combustion engine;

a first operation control means for controlling the operation of the first control object;

a second control object to be controlled in the internal combustion engine;

a second operation control means for controlling the operation of the second control object; and a control signal generation means for generating a first control signal enabling the first operation control means to control the operation of the first control object and generating a second control signal enabling the second operation control means to control the operation of the second control object, the control signal generation means generating the first control signal in such a manner that a target value for controlling the control amount of the first control object is input as a first control target value and the input first control target value is transformed in accordance with a predetermined first transformation rule and generating the second control signal in such a manner that a target value for the control of the control amount of the second control object is input as a second control target value and the input second control target value is transformed in accordance with a predetermined second transformation rule, wherein each of the operation control means controls the operation of the corresponding control object, thereby the control amount of each of the control objects is controlled, wherein the control device for the internal combustion engine further comprises:

an initial target value determination means for determining a target value of the control amount of the first control object as a first initial target value based on a predetermined condition and determining a target value of the control amount of the second control object as a second initial target value based on a predetermined condition; and a correction target value output means for correcting the first initial target value and the second initial target value determined by the initial target value determination means in accordance with a predetermined rule and outputting the respective corrected initial target values as a first correction target value and a second correction target value, wherein in the case where a constraint condition related to the internal combustion engine is satisfied when the control amount of the first control object and the control amount of the second control object are controlled in accordance with the first control signal and the second control signal generated by the control signal generation means by using the first initial target value and the second initial target value respectively as the first control target value and the second control target value, the first initial target value and the second initial target value are respectively input as the first control target value and the second control target value to the control signal generation means, and wherein in the case where a constraint condition related to the internal combustion engine is not satisfied when the control amount of the first control object and the control amount of the second control object are controlled in accordance with the first control signal and the second control signal generated by the control signal generation means by using the first initial target value and the second initial target value respectively as the first control target value and the second control target value, the first initial target value and the second initial target value are repeatedly corrected in accordance with the predetermined rule by the correction target value output means so as to satisfy the constraint condition, the respective corrected initial target values are output as the first correction target value and the second correction target value, and the first correction target value and the second correction target value output therefrom are respectively input as the first control target value and the second control target value to the control signal generation means.

According to the invention, in the case where the constraint condition related to the internal combustion engine is satisfied when the control amount of each control object is controlled in accordance with the control signal generated by using the initial target value as the control target value, the initial target value becomes the control target value. On the other hand, in the case where the constraint condition related to the internal combustion engine is not satisfied when the control amount of each control object is controlled in accordance with the control signal generated by using the initial target value as the control target value, the initial target value is repeatedly corrected in accordance with the predetermined rule until the constraint condition related to the internal combustion engine is satisfied, the corrected initial target value is output as the correction target value, and the output correction target value becomes the control target value. That is, the invention employs a configuration in which the initial target value is corrected by repeatedly using the specific predetermined rule so that the constraint condition related to the internal combustion engine is satisfied instead of a configuration in which the correction pattern for correcting the initial target value is acquired in advance for each situation so that the constraint condition related to the internal combustion engine is satisfied (that is, the control amount of each control object is appropriately controlled in accordance with the state of the internal combustion engine) in any situation and the initial target value is corrected by using the acquired correction pattern. In this way, according to the invention, since the initial target value is corrected by using the specific predetermined rule instead of the correction pattern acquired in advance for each situation, in the case where the control amount of each control object is maintained at a constant initial target value (that is, the control amount of each control object is controlled in a normal state), the control amount of each control object is maintained at the initial target value according to the appropriate control method (that is, in a state where the constraint condition related to the internal combustion engine is satisfied) during a process in which the control amount of each control object is maintained at a constant initial target value. In the case where the initial target value is changed and the control amount of each control object is controlled at the changed initial target value (that is, the control amount of each control object is controlled in a transient state), the control amount of each control object is controlled at the changed initial target value according to the appropriate control method (that is, in a state where the constraint condition related to the internal combustion engine is satisfied) during a process in which the control amount of each control object is controlled at the changed initial target value.

Further, according to the invention, in the case where the constraint condition related to the internal combustion engine is satisfied when the control amount of each control object is controlled in accordance with the control signal generated by using the initial target value as the control target value, the initial target value becomes the control target value. In the case where the constraint condition related to the internal combustion engine is not satisfied when the control amount of each control object is controlled in accordance with the control signal generated by using the initial target value as the control target value, the initial target value corrected so as to satisfy the constraint condition related to the internal combustion engine becomes the control target value. Accordingly, the control amount of each control object is controlled in a state where the constraint condition related to the internal combustion engine is satisfied in the control of the control amounts of both control objects. For this reason, even when there is interference in the control of the control amounts of respective control objects, the control amount of each control object is maintained or controlled at the initial target value in a state where the constraint condition related to the internal combustion engine is satisfied (that is, the control is appropriately performed in accordance with the state of the internal combustion engine).

Further, in order to attain the above-described object, an eleventh aspect of the invention provides the control device for the internal combustion engine according to the tenth aspect of the invention, further comprising:

an estimation means for estimating the state of the internal combustion engine when the control amount of each of the control objects is controlled in accordance with the first control signal and the second control signal generated by the control signal generation means by using the first initial target value and the second initial target value respectively as the first control target value and the second control target value, wherein the first initial target value and the second initial target value are corrected by the correction target value output means so that the constraint condition is satisfied based on the state of the internal combustion engine estimated by the estimation means.

According to the invention, the state of the internal combustion engine is estimated when the control amount of each control object is controlled by using the initial target value as the control target value before the control of the control amount of each control object is actually started after the initial target value is determined. Then, it is determined whether the constraint condition related to the internal combustion engine is satisfied based on the estimated state of the internal combustion engine. When it is determined that the constraint condition is satisfied, the initial target value is set as the control target value of the control amount of each control object. When it is determined that the constraint condition is not satisfied, the initial target value is corrected so as to satisfy the constraint condition and the corrected initial target value is set as the control target value of the control amount of each control object. Then, the control of the control amount of each control object is actually started based on the control target value set in this way. For this reason, the control amount of each control object is maintained or controlled at the initial target value so as to be reliably appropriate for the state of the internal combustion engine.

Further, in order to attain the above-described object, a twelfth aspect of the invention provides the control device for the internal combustion engine according to the eleventh aspect of the invention, wherein the estimation means estimates the state of the internal combustion engine when the control amount of each of the control objects is controlled in accordance with the first control signal and the second control signal generated by the control signal generation means by using the first initial target value and the second initial target value respectively as the first control target value and the second control target value by a state space model related to the internal combustion engine.

In the invention, the state space model related to the internal combustion engine includes the internal state of the internal combustion engine as a variable. Accordingly, according to the invention, the state of the internal combustion engine is estimated in a state where the internal state of the internal combustion engine is accurately reflected. For this reason, the control amount of each control object is maintained or controlled at the initial target value so as to be more appropriate for the state of the internal combustion engine.

Further, in order to attain the above-described object, a thirteenth aspect of the invention provides the control device for the internal combustion engine according to any one of the tenth to twelfth aspects of the invention, wherein the constraint condition is indicated by a bounded closed set, the internal state of the internal combustion engine related to the constraint condition is indicated by a vector, and it is determined that the constraint condition is satisfied when the vector is included in the bounded closed set.

According to the invention, it is determined whether the constraint condition is satisfied by using the closed set indicating the constraint condition and the vector indicating the internal state of the internal combustion engine related to the constraint condition. For this reason, it is easily and reliably determined whether the constraint condition is satisfied.

Further, in order to attain the above-described object, a fourteenth aspect of the invention provides the control device for the internal combustion engine according to any one of the tenth to thirteenth aspects of the invention, wherein the first initial target value and the second initial target value are corrected by the correction target value output means so that the first correction target value becomes a value closest to the first initial target value and the second correction target value becomes a value closest to the second initial target value.

According to the invention, even when the initial target value is corrected by the correction target value output means, the corrected initial target value, that is, the correction target value becomes a value closest to the corresponding initial target value. Accordingly, the control amount of each control object is controlled based on the correction target value which is a value closest to the initial target value. For this reason, from the viewpoint in which the control amount of each control object is promptly maintained or controlled at the initial target value and the viewpoint in which a large change in the control amount of each control object caused by the correction of the initial target value is suppressed, it may be understood that the control amount of each control object is maintained or controlled at the initial target value so as to be reliably appropriate for the state of the internal combustion engine.

In order to attain the above-described object, a fifteenth aspect of the invention provides the control device for the internal combustion engine according to any one of the tenth to fourteenth aspects of the invention, wherein the constraint condition includes:

at least one of a constraint condition related to the control amount of the first control object, a constraint condition related to the first control object, a constraint condition related to the first operation control means, and a constraint condition related to the first control signal given to the first operation control means; and at least one of a constraint condition related to the control amount of the second control object, a constraint condition related to the second control object, a constraint condition related to the second operation control means, and a constraint condition related to the second control signal given to the second operation control means.

According to the invention, in a state where both of the constraint condition related to the control amount of the first control object (that is, the constraint condition related to the control amount of the first control object, the constraint condition related to the first control object, the constraint condition related to the first operation control means, or the constraint condition related to the first control signal given to the first operation control means) and the constraint condition related to the control amount of the second control object (that is, the constraint condition related to the control amount of the second control object, the constraint condition related to the second control object, the constraint condition related to the second operation control means, or the constraint condition related to the second control signal given to the second operation control means) are satisfied, the control related to the control amount of the first control object (that is, the control of the control amount of the first control object, the control of the operation of the first control object, the control of the operation of the first operation control means, or the generation of the first control signal) and the control related to the control amount of the second control object (that is, the control of the control amount of the second control object, the control of the operation of the second control object, the control of the operation of the second operation control means, or the generation of the second control signal) are performed. Accordingly, even when there is interference between the control related to the control amount of the first control object and the control related to the control amount of the second control object, the control amount of each control object is maintained or controlled at the initial target value so as to be appropriate for each concerned control.

Further, in order to attain the above-described object, a sixteenth aspect of the invention provides the control device for the internal combustion engine according to the fifteenth aspect of the invention, wherein the constraint condition related to the control amount of the first control object is that the control amount of the first control object is in a predetermined allowable range, the constraint condition related to the first control object is that the operation state of the first control object is in a predetermined allowable range, the constraint condition related to the first operation control means indicates that the operation state of the first operation control means is in a predetermined allowable range, the constraint condition related to the first control signal given to the first operation control means indicates that the first control signal is in a predetermined allowable range, the constraint condition related to the control amount of the second control object is that the control amount of the second control object is in a predetermined allowable range, the constraint condition related to the second control object is that the operation state of the second control object is in a predetermined allowable range, the constraint condition related to the second operation control means indicates that the operation state of the second operation control means is in a predetermined allowable range, and the constraint condition related to the second control signal given to the second operation control means indicates that the second control signal is in a predetermined allowable range.

In the invention, it is obviously undesirable that the control amount of the control object becomes larger than the allowable range or smaller than the allowable range. Further, it is undesirable that the operation state of each control object exceeds the allowable range in consideration of not only the control object, but also the control of the control amount of the control object. Further, it is undesirable that the operation state of each of the operation control means exceeds the allowable range in consideration of not only the operation control means, but also the control of the control amount of the control object and the control object. Furthermore, it is undesirable that the control signal given to each of the operation control means exceeds the allowable range in consideration of not only the operation control means, but also the control of the control amount of the control object and the control object. Here, according to the invention, in a state where the control amount of each control object does not exceed the allowable range, the operation state of each control object does not exceed the allowable range, the operation state of each of the operation control means does not exceed the allowable range, or the control signal given to each of the operation control means does not exceed the allowable range, the control amount of each control object is controlled. For this reason, the control amount of each control object is maintained or controlled at the initial target value so as to be more appropriate for the concerned control.

In order to attain the above-described object, a seventeenth aspect of the invention provides the control device for the internal combustion engine according to the fifteenth or sixteenth aspect of the invention, wherein the first initial target value and the second initial target value are corrected by the correction target value output means so as to satisfy all of: the constraint condition related to the control amount of the first control object; the constraint condition related to the first control object; the constraint condition related to the first operation control means; the constraint condition related to the first control signal given to the first operation control means; the constraint condition related to the control amount of the second control object; the constraint condition related to the second control object; the constraint condition related to the second operation control means; and the constraint condition related to the second control signal given to the second operation control means.

According to the invention, the control amount of each control object is controlled based on the control target value in which all constraint conditions related to the control amount of the first control object and all constraint conditions related to the control amount of the second control object are satisfied. For this reason, the control amount of each control object is maintained or controlled at the initial target value so as to be appropriate for all controls.

Further, in order to attain the above-described object, an eighteenth aspect of the invention provides the control device for the internal combustion engine according to any one of the tenth to seventeenth aspects of the invention, wherein the first control object is a pressure control valve which controls a degree of increase in a pressure of air brought into a combustion chamber in a supercharger which increases the pressure of the air brought into the combustion chamber of the internal combustion engine, the second control object is an exhaust gas amount control valve which controls an amount of an exhaust gas introduced into an air intake passage in an exhaust recycling device which introduces the exhaust gas discharged from the combustion chamber into the air intake passage of the internal combustion engine so that the exhaust gas discharged from the combustion chamber is brought into the combustion chamber, the control amount of the first control object is the pressure of the air brought into the combustion chamber, the control amount of the second control object is the amount of the exhaust gas introduced into the air intake passage, the first operation control means is a pressure control valve actuator which controls the operation of the pressure control valve, and the second operation control means is an exhaust gas amount control valve actuator which controls the operation of the exhaust gas amount control valve.

In the invention, when the pressure of the air brought into the combustion chamber changes, the amount of the exhaust gas brought into the air intake passage also changes. When the amount of the exhaust gas brought into the air intake passage changes, the amount of the air brought into the combustion chamber also changes. That is, the pressure of the air brought into the combustion chamber and the amount of the exhaust gas brought into the air intake passage are control amounts interfering with each other. Accordingly, the control of the opening degree of the pressure control valve of the supercharger and the control of the opening degree of the exhaust gas amount control valve of the exhaust recycling device may also be controls interfering with each other, the control of the pressure control valve actuator and the control of the exhaust gas amount control valve actuator may also be controls interfering with each other, and the control signal given to the pressure control valve actuator and the control signal given to the exhaust gas amount control valve actuator may also be control signals interfering with each other. Here, according to the invention, in a state where the constraint condition related to the internal combustion engine is satisfied, the control of the pressure of the air brought into the combustion chamber, the control of the amount of the exhaust gas brought into the air intake passage, the control of the operation of the pressure control valve, the control of the operation of the exhaust gas amount control valve, the control of the operation of the pressure control valve actuator, the control of the operation of the exhaust gas amount control valve actuator, the generation of the control signal given to the pressure control valve actuator, and the generation of the control signal given to the exhaust gas amount control valve actuator are performed, where the control and the generation interfere with each other. For this reason, the pressure of the air brought into the combustion chamber and the amount of the exhaust gas brought into the air intake passage are maintained or controlled at the respective initial target values so as to be more appropriate for the state of the internal combustion engine.

In order to attain the above-described object, a nineteenth aspect of the invention provides a control device for an internal combustion engine comprising a control process execution means for executing a control process in which a target value for controlling a control amount of a first control object of the internal combustion engine is input as a first control target value, a first operation amount to be input to the first control object in accordance with the input first control target value is determined, a target value for controlling a control amount of a second control object of the internal combustion engine is input as a second control target value, and a second operation amount to be input to the second control object in accordance with the input second control target value is determined, wherein the control amount of the first control object is controlled by controlling the operation of the first control object in accordance with the first operation amount determined by the control process execution means, the control amount of the second control object is controlled by controlling the operation of the second control object in accordance with the second operation amount determined by the control process execution means, wherein the control device for the internal combustion engine further comprises:

an initial target value determination means for determining the target value of the control amount of the first control object as an initial target value and determining the target value of the control amount of the second control object as an initial target value;

a first determination means for determining whether a constraint condition related to the internal combustion engine is satisfied when the first operation amount determined by the control process execution means by using the first initial target value determined by the initial target value determination means as the first control target value is input to the first control object and the second operation amount determined by the control process execution means by using the second initial target value determined by the initial target value determination means as the second control target value is input to the second control object;

an initial target value input means for inputting the first initial target value and the second initial target value as the first control target value and the second control target value to the control process execution means when it is determined that the constraint condition is satisfied by the first determination means;

a correction target value output means for correcting the first initial target value and the second initial target value in accordance with a predetermined rule when it is determined that the constraint condition is not satisfied by the first determination means and outputting the respective corrected initial target values as a first correction target value and a second correction target value;

a second determination means for determining whether the constraint condition is satisfied when a first operation amount determined by the control process execution means by using the first correction target value output from the correction target value output means as the first control target value is input to the first control object and a second operation amount determined by the control process execution means by using the second correction target value as the second control target value is input to the second control object; and a correction target value input means for inputting the first correction target value and the second correction target value as the first control target value and the second control target value to the control process execution means when it is determined that the constraint condition is satisfied by the second determination means, wherein when it is determined that the constraint condition is not satisfied by the second determination means, the first correction target value and the second correction target value are further corrected in accordance with the predetermined rule by the correction target value output means, the further corrected correction target values are output as a new first correction target value and a new second correction target value, and it is determined whether the constraint condition is satisfied by the second determination means when the first operation amount determined by the control process execution means by using the output new first correction target value as the first control target value is input to the first control object and the second operation amount determined by the control process execution means by using the output new second correction target value as the second control target value is input to the second control object, and the correction of the first correction target value and the second correction target value and the output of the corrected first correction target value and the corrected second correction target value are repeatedly performed by the correction target value output means until it is determined that the constraint condition is satisfied by the second determination means.

According to the invention, in the case where the constraint condition related to the internal combustion engine is satisfied when the control amount of each control object is controlled in accordance with the operation amount determined by using the initial target value as the control target value, the initial target value becomes the control target value. On the other hand, in the case where the constraint condition related to the internal combustion engine is not satisfied when the control amount of each control object is controlled in accordance with the operation amount determined by using the initial target value as the control target value, the initial target value is corrected in accordance with the predetermined rule and is output as the correction target value. In the case where the constraint condition related to the internal combustion engine is satisfied when the control amount of each control object is controlled in accordance with the operation amount in which the output correction target value is determined as the control target value, the correction target value becomes the control target value. On the other hand, in the case where the constraint condition related to the internal combustion engine is not satisfied when the control amount of each control object is controlled in accordance with the operation amount determined by using the correction target value as the control target value, the correction target value is repeatedly corrected in accordance with the predetermined rule until the constraint condition related to the internal combustion engine is satisfied, and the corrected value is output as the new correction target value. Accordingly, the correction target value when the constraint condition related to the internal combustion engine is satisfied becomes the control target value. That is, the invention employs a configuration in which the initial target value or the correction target value is corrected by repeatedly using the specific predetermined rule so that the constraint condition related to the internal combustion engine is satisfied instead of a configuration in which the correction pattern for correcting the initial target value is acquired in advance for each situation so that the constraint condition related to the internal combustion engine is satisfied (that is, the control amount of each control object is appropriate in the control of the state of the internal combustion engine) in any situation and the initial target value is corrected by using the acquired correction pattern. In this way, according to the invention, since the initial target value or the correction target value is corrected by using the specific predetermined rule instead of the correction pattern acquired in advance for each situation, in the case where the control amount of each control object is maintained at a constant initial target value (that is, the control of the control amount of each control object is in a normal state), the control amount of each control object is maintained at the initial target value according to the appropriate control method (that is, in a state where the constraint condition related to the internal combustion engine is satisfied) during a process in which the control amount of each control object is maintained at a constant initial target value. In the case where the initial target value is changed and the control amount of each control object is controlled at the changed initial target value (that is, the control of the control amount of each control object is in a transient state), the control amount of each control object is controlled at the changed initial target value according to the appropriate control method (that is, in a state where the constraint condition related to the internal combustion engine is satisfied) during a process in which the control amount of each control object is controlled at the changed initial target value.

Further, according to the invention, in the case where the constraint condition related to the internal combustion engine is satisfied when the control amount of each control object is controlled in accordance with the operation amount in which the initial target value is determined as the control target value, the initial target value becomes the control target value. In the case where the constraint condition related to the internal combustion engine is not satisfied when the control amount of each control object is controlled in accordance with the operation amount in which the initial target value is determined as the control target value, the initial target value corrected so as to satisfy the constraint condition related to the internal combustion engine becomes the control target value. Accordingly, the control amount of each control object is controlled in a state where the constraint condition related to the internal combustion engine is satisfied in the control of the control amounts of both control objects. For this reason, even when there is interference in the control of the control amounts of respective control objects, the control amount of each control object is maintained or controlled at the initial target value in a state where the constraint condition related to the internal combustion engine is satisfied (that is, the control is appropriately performed in accordance with the state of the internal combustion engine).

Further, in order to attain the above-described object, a twentieth aspect of the invention provides the control device for the internal combustion engine according to the nineteenth aspect of the invention, further comprising:

an estimation means for estimating the state of the internal combustion engine when the control amount of each of the control objects is controlled in accordance with the operation amount determined by the control process execution means by using the first initial target value and the second initial target value or the first correction target value and the second correction target value respectively as the first control target value and the second control target value, wherein it is determined whether the constraint condition is satisfied by the first determination means or the second determination means based on the state of the internal combustion engine estimated by the estimation means.

According to the invention, the state of the internal combustion engine is estimated when the control amount of each control object is controlled by using the initial target value or the correction target value as the control target value before the control of the control amount of each control object is actually started after the initial target value is determined or the correction target value is output. Then, it is determined whether the constraint condition related to the internal combustion engine is satisfied based on the estimated state of the internal combustion engine. The initial target value or the correction target value obtained when it is determined that the constraint condition is satisfied is set as the control target value. Then, the control of the control amount of each control object is actually started based on the control target value set in this way. For this reason, the control amount of each control object is maintained or controlled at the initial target value so as to be reliably appropriate for the state of the internal combustion engine.

Further, in order to attain the above-described object, a twenty-first aspect of the invention provides the control device for the internal combustion engine according to the twentieth aspect of the invention, wherein the estimation means estimates the state of the internal combustion engine when the control amount of each of the control objects is controlled in accordance with the first operation amount and the second operation amount determined by the control process execution means by using the first initial target value and the second initial target value or the first correction target value and the second correction target value respectively as the first control target value and the second control target value by a state space model related to the internal combustion engine.

In the invention, the state space model related to the internal combustion engine includes the internal state of the internal combustion engine as a variable. Accordingly, according to the invention, the state of the internal combustion engine is estimated in a state where the internal state of the internal combustion engine is accurately reflected. For this reason, the control amount of each control object is maintained or controlled at the initial target value so as to be more appropriate for the state of the internal combustion engine.

Further, in order to attain the above-described object, a twenty-second aspect of the invention provides the control device for the internal combustion engine according to any one of the nineteenth to twenty-first aspects of the invention, wherein the constraint condition is indicated by a bounded closed set, the internal state of the internal combustion engine related to the constraint condition is indicated by a vector, and it is determined that the constraint condition is satisfied when the vector is included in the bounded closed set.

According to the invention, it is determined whether the constraint condition is satisfied by using the closed set indicating the constraint condition and the vector indicating the internal state of the internal combustion engine related to the constraint condition. For this reason, it is easily and reliably determined whether the constraint condition is satisfied.

Further, in order to attain the above-described object, a twenty-third aspect of the invention provides the control device for the internal combustion engine according to any one of the nineteenth to twenty-second aspects of the invention, wherein the first initial target value and the second initial target value or the first correction target value and the second correction target value are corrected by the correction target value output means so that the first correction target value becomes a value closest to the first initial target value and the second correction target value becomes a value closest to the second initial target value.

According to the invention, even when the initial target value or the correction target value is corrected by the correction target value output means, the corrected initial target value or the corrected correction target value becomes a value closest to the corresponding initial target value. Accordingly, the control amount of each control object may be controlled based on the correction target value which is a value closest to the initial target value. For this reason, from the viewpoint in which the control amount of each control object is promptly maintained or controlled at the initial target value and the viewpoint in which a large change in the control amount of each control object caused by the correction of the initial target value or the correction target value is suppressed, it may be understood that the control amount of each control object is maintained or controlled at the initial target value so as to be reliably appropriate for the state of the internal combustion engine.

In order to attain the above-described object, a twenty-fourth aspect of the invention provides The control device for the internal combustion engine according to any one of the nineteenth to twenty-third aspects of the invention, further comprising:

a first operation control means for controlling the operation of the first control object;

a second operation control means for controlling the operation of the second control object; and a control signal generation means for generating a first control signal enabling the first operation control means to control the operation of the first control object and generating a second control signal enabling the second operation control means to control the operation of the second control object, the control signal generation means generating the first control signal in such a manner that the first control target value is input and the input first control target value is transformed in accordance with a predetermined first transformation rule and generating the second control signal in such a manner that the second control target value is input and the input second control target value is transformed in accordance with a predetermined second transformation rule, wherein the first operation control means controls the operation of the first control object by inputting the first operation amount determined by the control process execution means in accordance with the first control signal generated by the control signal generation means to the first control object, wherein the second operation control means controls the operation of the second control object by inputting the second operation amount determined by the control process execution means in accordance with the second control signal generated by the control signal generation means to the second control object, and wherein the constraint condition includes:

at least one of a constraint condition related to the control amount of the first control object, a constraint condition related to the first control object, a constraint condition related to the first operation amount to be input to the first control object, a constraint condition related to the first operation control means, and a constraint condition related to the first control signal given to the first operation control means; and at least one of a constraint condition related to the control amount of the second control object, a constraint condition related to the second control object, a constraint condition related to the second operation amount to be input to the second control object, a constraint condition related to the second operation control means, and a constraint condition related to the second control signal given to the second operation control means.

According to the invention, in a state where both of the constraint condition related to the control amount of the first control object (that is, the constraint condition related to the control amount of the first control object, the constraint condition related to the first control object, the constraint condition related to the first operation amount to be input to the first control object, the constraint condition related to the first operation control means, or the constraint condition related to the first control signal given to the first operation control means) and the constraint condition related to the control amount of the second control object (that is, the constraint condition related to the control amount of the second control object, the constraint condition related to the second control object, the constraint condition related to the second operation amount to be input to the second control object, the constraint condition related to the second operation control means, or the constraint condition related to the second control signal given to the second operation control means) are satisfied, the control related to the control amount of the first control object (that is, the control of the control amount of the first control object, the control of the operation of the first control object, the determination of the first operation amount, the control of the operation of the first operation control means, or the generation of the first control signal) and the control related to the control amount of the second control object (that is, the control of the control amount of the second control object, the control of the operation of the second control object, the determination of the second operation amount, the control of the operation of the second operation control means, or the generation of the second control signal) are performed. Accordingly, even when there is interference between the control related to the control amount of the first control object and the control related to the control amount of the second control object, the control amount of each control object is maintained or controlled at the initial target value so as to be appropriate for each concerned control.

Further, in order to attain the above-described object, a twenty-fifth aspect of the invention provides the control device for the internal combustion engine according to the twenty-fourth aspect of the invention, wherein the constraint condition related to the control amount of the first control object is that the control amount of the first control object is in a predetermined allowable range, the constraint condition related to the first control object is that the operation state of the first control object is in a predetermined allowable range, the constraint condition related to the first operation amount to be input to the first control object is that the first operation amount is in a predetermined allowable range, the constraint condition related to the first operation control means indicates that the operation state of the first operation control means is in a predetermined allowable range, the constraint condition related to the first control signal given to the first operation control means indicates that the first control signal is in a predetermined allowable range, the constraint condition related to the control amount of the second control object is that the control amount of the second control object is in a predetermined allowable range, the constraint condition related to the second control object is that the operation state of the second control object is in a predetermined allowable range, the constraint condition related to the second operation amount to be input to the second control object is that the second operation amount is in a predetermined allowable range, the constraint condition related to the second operation control means indicates that the operation state of the second operation control means is in a predetermined allowable range, and the constraint condition related to the second control signal given to the second operation control means indicates that the second control signal is in a predetermined allowable range.

In the invention, it is obviously undesirable that the control amount of the control object becomes larger than the allowable range or smaller than the allowable range. Further, it is undesirable that the operation state of each control object exceeds the allowable range in consideration of not only the control object, but also the control of the control amount of the control object. Further, it is undesirable that the operation amount to be input to each control object becomes larger than the allowable range or smaller than the allowable range in consideration of not only the control object, but also the control of the control amount of the control object. Further, it is undesirable that the operation state of the operation control means exceeds the allowable range in consideration of not only the operation control means, but also the control of the control amount of the control object and the control object. Furthermore, it is undesirable that the control signal given to each of the operation control means exceeds the allowable range in consideration of not only the operation control means, but also the control of the control amount of the control object. Here, according to the invention, in a state where the control amount of each control object does not exceed the allowable range, the operation state of each control object does not exceed the allowable range, the operation amount to be input to each control object does not exceed the allowable range, the operation state of each of the operation control means does not exceed the allowable range, or the control signal given to each of the operation control means does not exceed the allowable range, the control amount of each control object is controlled. For this reason, the control amount of each control object is maintained or controlled at the initial target value so as to be more appropriate for the concerned control.

In order to attain the above-described object, a twenty-sixth aspect of the invention provides the control device for the internal combustion engine according to the twenty-fourth or twenty-fifth aspect of the invention, wherein the first initial target value and the second initial target value or the first correction target value and the second correction target value are corrected by the correction target value output means so as to satisfy all of: the constraint condition related to the control amount of the first control object; the constraint condition related to the first control object; the constraint condition related to the first operation amount to be input to the first control object; the constraint condition related to the first operation control means; the constraint condition related to the first control signal given to the first control object; the constraint condition related to the control amount of the second control object; the constraint condition related to the second control object; the constraint condition related to the second operation amount to be input to the second control object; the constraint condition related to the second operation control means; and the constraint condition related to the second control signal given to the second operation control means.

According to the invention, the control amount of each control object is controlled based on the control target value in which all constraint conditions related to the control amount of the first control object and all constraint conditions related to the control amount of the second control object are satisfied. For this reason, the control amount of each control object is maintained or controlled at the initial target value so as to be appropriate for all controls.

Further, in order to attain the above-described object, a twenty-seventh aspect of the invention provides the control device for the internal combustion engine according to any one of the nineteenth to twenty-sixth aspects of the invention, wherein the first control object is a pressure control valve which controls a degree of increase in a pressure of air brought into a combustion chamber increases in a supercharger increasing the pressure of the air brought into the combustion chamber of the internal combustion engine, the second control object is an exhaust gas amount control valve which controls an amount of an exhaust gas introduced into an air intake passage in an exhaust recycling device which introduces the exhaust gas discharged from the combustion chamber into the air intake passage of the internal combustion engine so that the exhaust gas discharged from the combustion chamber is brought into the combustion chamber, the control amount of the first control object is the pressure of the air brought into the combustion chamber, the control amount of the second control object is the amount of the exhaust gas introduced into the air intake passage, the first operation control means is a pressure control valve actuator which controls the operation of the pressure control valve, and the second operation control means is an exhaust gas amount control valve actuator which controls the operation of the exhaust gas amount control valve.

In the invention, when the pressure of the air brought into the combustion chamber changes, the amount of the exhaust gas brought into the air intake passage also changes. When the amount of the exhaust gas brought into the air intake passage changes, the amount of the air brought into the combustion chamber also changes. That is, the pressure of the air brought into the combustion chamber and the amount of the exhaust gas brought into the air intake passage are control amounts interfering with each other. Accordingly, the control of the opening degree of the pressure control valve of the supercharger and the control of the opening degree of the exhaust gas amount control valve of the exhaust recycling device may also be controls interfering with each other, the operation amount input to the pressure control valve and the operation amount input to the exhaust gas amount control valve may also be operation amounts interfering with each other, the control of the pressure control valve actuator and the control of the exhaust gas amount control valve actuator may also be controls interfering with each other, and the control signal given to the pressure control valve actuator and the control signal given to the exhaust gas amount control valve actuator may also be control signals interfering with each other. Here, according to the invention, in a state where the constraint condition related to the internal combustion engine is satisfied, the control of the pressure of the air brought into the combustion chamber, the control of the amount of the exhaust gas brought into the air intake passage, the control of the operation of the pressure control valve, the control of the operation of the exhaust gas amount control valve, the determination of the operation amount input to the pressure control valve, the determination of the operation amount input to the exhaust gas amount control valve, the control of the operation of the pressure control valve actuator, the control of the operation of the exhaust gas amount control valve actuator, the generation of the control signal given to the pressure control valve actuator, and the generation of the control signal given to the exhaust gas amount control valve actuator are performed, where the control, the determination, and the generation interfere with each other. For this reason, the pressure of the air brought into the combustion chamber and the amount of the exhaust gas brought into the air intake passage are maintained or controlled at the respective initial target values so as to be more appropriate for the state of the internal combustion engine.

DESCRIPTION OF EMBODIMENTS

Figure 1:
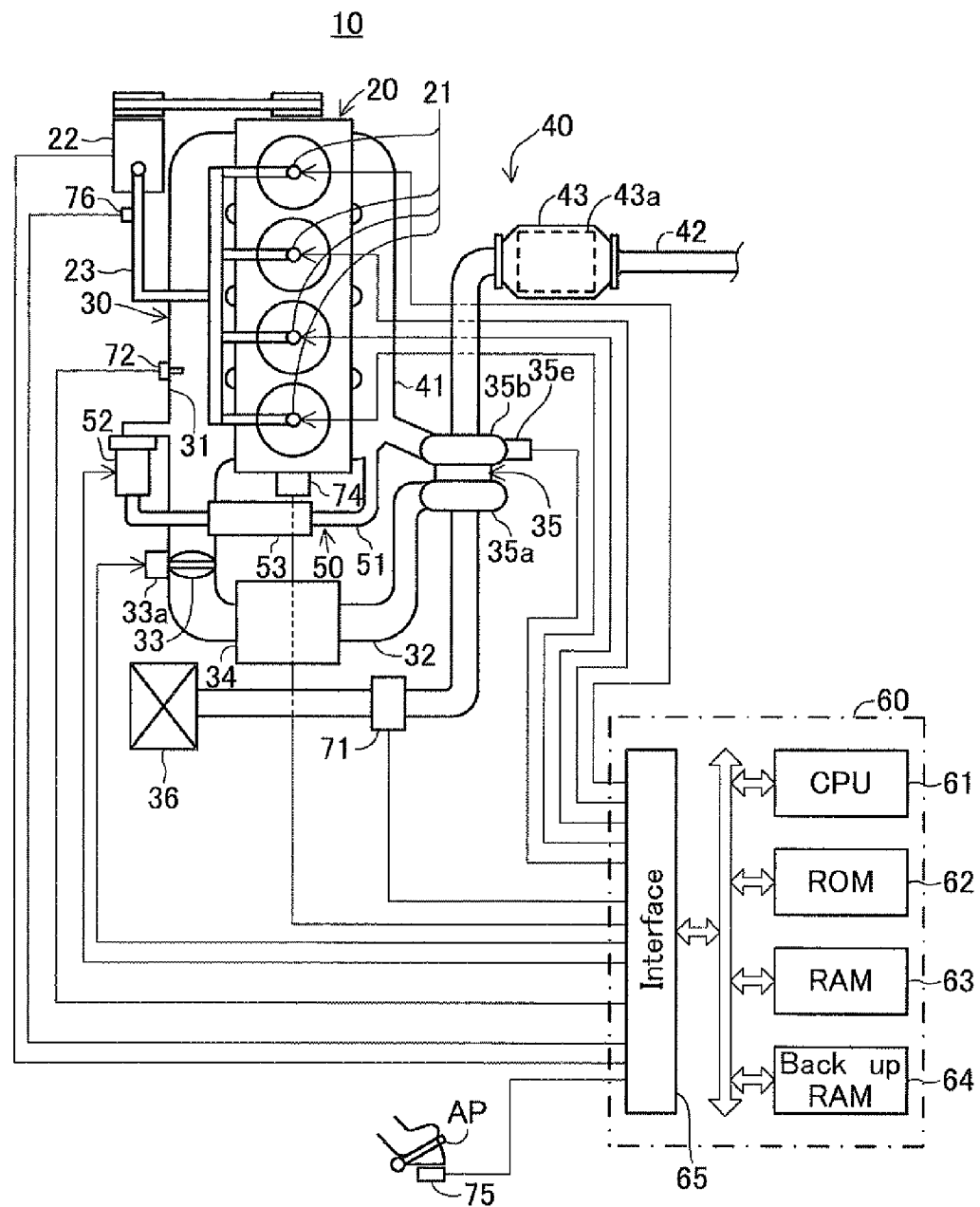
FIG. 1 is a schematic diagram of an internal combustion engine which employs a control device of the invention.

Hereinafter, an embodiment of a control device for an internal combustion engine of the invention will be described by referring to the drawings. The embodiment to be described below is an embodiment when the control device of the invention is applied to an internal combustion engine illustrated in FIG. 1.

An internal combustion engine 10 illustrated in FIG. 1 includes a body of an internal combustion engine (hereinafter, referred to as an 'engine body') 20, fuel injection valves 21 which are arranged so as to respectively correspond to four combustion chambers of the engine body 20, and a fuel pump 22 which supplies fuel to the fuel injection valves 21 through a fuel supply pipe 23. Further, the internal combustion engine 10 includes an air intake system 30 which supplies air into the combustion chamber from the outside and an exhaust system 40 which discharges an exhaust gas, discharged from the combustion chamber, to the outside. Further, the internal combustion engine 10 is a compression ignition type internal combustion engine (which is a so-called diesel engine).

The air intake system 30 includes an air intake branch pipe 31 and an air intake pipe 32. One end portion (that is, a branch portion) of the air intake branch pipe 31 is connected to an air intake port (not illustrated) which is formed inside the engine body 10 so as to correspond to each combustion chamber. On the other hand the other end portion of the air intake branch pipe 31 is connected to the air intake pipe 32. A throttle valve 33 which controls the amount of air flowing inside the air intake pipe 32 is disposed inside the air intake pipe 32. An actuator (hereinafter, referred to as a 'throttle valve actuator') 33a which controls the opening degree of the throttle valve 33 is attached to the throttle valve 33. Furthermore, an intercooler 34 which cools air flowing inside the air intake pipe 32 is disposed inside the air intake pipe 32. Furthermore, an air cleaner 36 is disposed at the end portion which is disposed outside the air intake pipe 32.

On the other hand the exhaust system 40 includes an exhaust branch pipe 41 and an exhaust pipe 42. One end portion (that is, a branch portion) of the exhaust branch pipe 41 is connected to an exhaust port (not illustrated) formed inside the engine body 10 so as to correspond to each combustion chamber. On the other hand the other end portion of the exhaust branch pipe 41 is connected to the exhaust pipe 42. The exhaust pipe 42 is provided with a catalyst converter 43 which has therein an exhaust purification catalyst 43a purifying a specific component in an exhaust gas.

Figure 2:
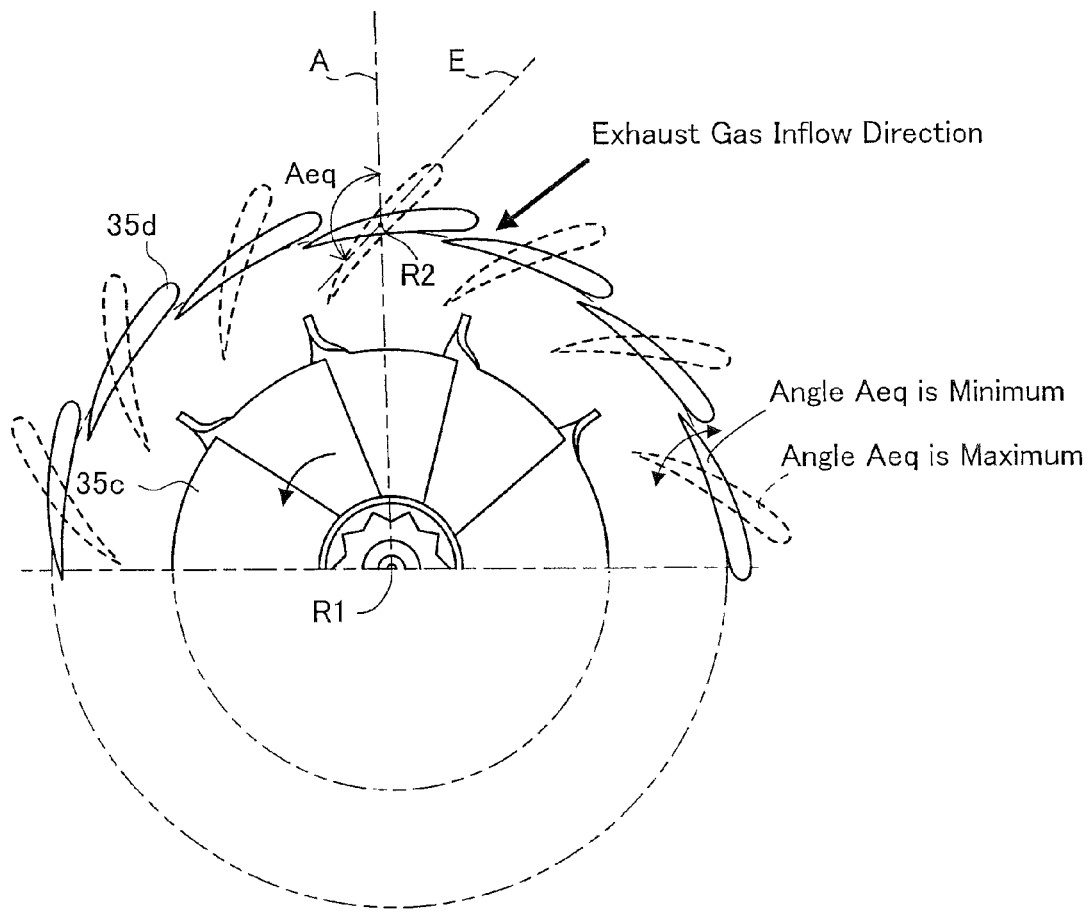
FIG. 2 is a diagram illustrating the inside of an exhaust turbine of a supercharger of the internal combustion engine illustrated in FIG. 1.

Further, the internal combustion engine 10 includes a supercharger 35. The supercharger 35 includes a compressor 35a which is disposed inside the air intake pipe 32 on the upstream side of the intercooler 34 and an exhaust turbine 35b which is disposed inside the exhaust pipe 42 on the upstream side of the catalyst converter 43. As illustrated in FIG. 2, the exhaust turbine 35b includes an exhaust turbine body 35c and plural blade-like vanes 35d.

The exhaust turbine body 35c is connected to the compressor 35a through a shaft (not illustrated). When the exhaust turbine body 35c is rotated by an exhaust gas, the rotation is transmitted to the compressor 35a through the shaft, so that the compressor 35a is rotated.

On the other hand the vanes 35d are arranged at equal angular intervals in a radial shape about the rotation axis R1 of the exhaust turbine body 35c so as to surround the exhaust turbine body 35c. Further, the respective vanes 35d are arranged so as to be rotatable about the corresponding axis indicated by the reference numeral R2 in FIG. 2. Then, when the extension direction of each vane 35d, that is, the direction indicated by the reference numeral E in FIG. 2 is referred to as an 'extension direction', and the line connecting the rotation axis R1 of the exhaust turbine body 35c to the rotation axis R2 of the vane 35d, that is, the line indicated by the reference numeral A in FIG. 2 is referred to as a 'reference line', the respective vanes 35d are rotated so that the angle formed between the extension direction E and the reference line A corresponding thereto is constant for all vanes 35d. Then, when the respective vanes 35d are rotated so that the angle formed between the extension direction E and the reference line A corresponding thereto becomes smaller, that is, the flow channel area between the adjacent vanes 35d becomes smaller, the flow speed of the exhaust gas supplied to the exhaust turbine body 35c becomes faster. As a result, the rotation speed of the exhaust turbine body 35c becomes faster, and hence the rotation speed of the compressor 35a also becomes faster. Accordingly, the air which flows inside the air intake pipe 32 is largely compressed by the compressor 35a. For this reason, as the angle formed between the extension direction E of each vane 35d and the reference line corresponding thereto (hereinafter, the angle will be referred to as a 'vane opening degree') becomes smaller, the degree in which the air flowing inside the air intake pipe 32 is compressed by the compressor 35a becomes larger.

Furthermore, each vane 35d is rotated by an actuator (hereinafter, referred to as a 'vane actuator') 35e.

Further, the internal combustion engine 10 includes an exhaust recycling device (hereinafter, this will be referred to as an 'EGR device') 50. The EGR device 50 includes an exhaust recirculation pipe (hereinafter, this will be referred to as an 'EGR pipe') 51. One end of the EGR pipe 51 is connected to the exhaust branch pipe 41. On the other hand, the other end of the EGR pipe 51 is connected to the air intake branch pipe 31. Further, the EGR pipe 51 is provided with an exhaust recirculation control valve (hereinafter, the exhaust recirculation control valve will be referred to as an 'EGR control valve') 52 which controls the flow rate of the exhaust gas flowing inside the EGR pipe 51. The EGR control valve 52 is operated by an actuator (not illustrated and hereinafter, this will be referred to as an 'EGR control valve actuator'). In the internal combustion engine 10, the flow rate of the exhaust gas flowing inside the EGR pipe 51 becomes larger as the opening degree of the EGR control valve 52 (hereinafter, the opening degree will be referred to as the 'opening degree of the EGR control valve') becomes larger. Furthermore, the EGR pipe 51 is provided with an exhaust recirculation cooler 53 which cools the exhaust gas flowing inside the EGR pipe 51.

Further, an air flow meter 71 which detects the flow rate of air flowing inside the air intake pipe 32 is attached to the air intake pipe 32 on the downstream side of the air cleaner 36 and the upstream side of the compressor 35*a*. Further, a pressure sensor (hereinafter, referred to as an 'air intake pressure sensor') 72 which detects the pressure inside the air intake branch pipe 31 is attached to the air intake branch pipe 31.

Further, the internal combustion engine 10 includes an electronic control device 60. The electronic control device 60 includes a micro processor (CPU) 61, a read only memory (ROM) 62, a random access memory (RAM) 63, a backup RAM (Back up RAM) 64, and an interface 65. To the interface 65, the fuel injection valves 21, the fuel pump 22, a throttle valve actuator 33*a*, a vane actuator 35*e*, and the EGR control valve actuator are connected, and control signals which control the operations thereof are applied from the electronic control device 60 through the interface 65. Further, to the interface 65, the air flow meter 71, a air intake pressure sensor 72, and an accelerator opening degree sensor 75 for detecting the stepping amount of the accelerator pedal AP are connected, and a signal corresponding to the flow rate detected by the air flow meter 71, a signal corresponding to the pressure detected by the air intake pressure sensor 72, and a signal corresponding to the stepping amount of the accelerator pedal AP detected by the accelerator opening degree sensor 75 are input to the interface 65.

Incidentally, as described above, in the embodiment, the air flowing inside the air intake pipe 32 is compressed by the compressor 35*a* of the supercharger 35. Then, the pressure of the air compressed by the compressor 35*a* (hereinafter, the pressure will be referred to as a 'supercharging pressure') may be controlled by controlling the rotation position (that is, the vane opening degree) of the vane 35*d* of the exhaust turbine 35*b*, and if the conditions other than the vane opening degree are the same, the supercharging pressure increases as the vane opening degree decreases. Further, as described above, in the embodiment, an exhaust gas (hereinafter, the exhaust gas will be referred to as an 'EGR gas') is introduced into the air flowing inside the air intake pipe 32 by the EGR device 50. Here, the amount of the EGR gas (hereinafter, the amount will be referred to as an 'EGR gas amount') may be controlled by controlling the opening degree of the EGR control valve 52, that is, the opening degree of the EGR control valve, and if the conditions other than the opening degree of the EGR control valve are the same, the EGR gas amount increases as the opening degree of the EGR control valve increases.

Incidentally, in the control device of the embodiment, the target value for the supercharging pressure (hereinafter, the target value will be referred to as a 'target supercharging pressure') is set, and the vane opening degree is controlled so that the actual supercharging pressure becomes the target supercharging pressure. Further, in the control device of the embodiment, as the parameter representing the EGR gas amount, the ratio of the EGR gas amount with respect to the total amount of the gas brought into the combustion chamber (hereinafter, the ratio will be referred to as an 'EGR ratio') is employed, the target value for the EGR ratio (hereinafter, the target value will be referred to as a 'target EGR ratio') is set, and the opening degree of the EGR control valve is controlled so that the actual EGR ratio becomes the target EGR ratio. Next, the control of the supercharging pressure and the EGR ratio will be described.

When the target supercharging pressure is set, the deviation of the actual supercharging pressure with respect to the target supercharging pressure (hereinafter, the deviation will be referred to as a 'supercharging pressure deviation') is calculated in the electronic control device 60. Here, since the pressure detected by the air intake pressure sensor 72 corresponds to the supercharging pressure, in the embodiment, the pressure detected by the air intake pressure sensor 72 is used as the actual supercharging pressure. Further, the setting of the target supercharging pressure will be described in detail later.

When the supercharging pressure deviation is calculated, the supercharging pressure deviation is transformed in accordance with a transformation rule set in advance in the electronic control device 60 (in other words, a predetermined control rule) so as to generate a control signal. The control signal which is generated herein is a control signal which is applied from the electronic control device 60 to the vane actuator 35*e* so as to allow the vane actuator 35*e* to operate the vane 35*d*. Further, the predetermined transformation rule (hereinafter, the transformation rule will be referred to as a 'supercharging pressure deviation transformation rule') transforms the supercharging pressure deviation into the control signal which enables the vane actuator 35*e* to operate the vane 35*d* so that the supercharging pressure deviation decreases.

When the control signal which is generated by the transformation from the supercharging pressure deviation (hereinafter, the control signal will be referred to as a 'vane control signal') is applied from the electronic control device 60 to the vane actuator 35*e*, the vane actuator 35*e* operates the vane 35*e* in accordance with the vane control signal. That is, the vane actuator 35*e* inputs the operation amount in accordance with the vane control signal (hereinafter, the operation amount will be referred to as a 'vane operation amount') to the vane 35*e*.

Here, when the supercharging pressure deviation is a positive value, that is, the actual supercharging pressure is lower than the target supercharging pressure, the vane actuator 35*e* operates the vane 35*d* so that the vane opening degree decreases. Accordingly, the actual supercharging pressure increases. On the other hand, when the supercharging pressure deviation is a negative value, that is, the actual supercharging pressure is higher than the target supercharging pressure, the vane actuator 35*e* operates the vane 35*d* so that the vane opening degree increases. Accordingly, the actual supercharging pressure decreases.

On the other hand, when the target EGR ratio is set, the deviation of the actual EGR ratio with respect to the target EGR ratio (hereinafter, the deviation will be referred to as an 'EGR ratio deviation') is calculated in the electronic control device 60.

When the EGR ratio deviation is calculated, the EGR ratio deviation is transformed in accordance with a predetermined transformation rule (in other words, a predetermined control rule) in the electronic control device 60 so as to generate a control signal. The control signal which is generated herein is a control signal which is applied to the EGR control valve actuator so that the EGR control valve actuator operates the EGR control valve 52. Further, the predetermined transformation rule (hereinafter, the transformation rule will be referred to as an 'EGR ratio deviation transformation rule') is used to transform the EGR ratio deviation into the control signal which enables the EGR control valve actuator to operate the EGR control valve 52 so that the EGR ratio deviation decreases.

When the control signal which is generated by the transformation of the EGR ratio deviation (hereinafter, the control signal will be referred to as an 'EGR control valve control signal') is applied from the electronic control device 60 to the EGR control valve actuator, the EGR control valve actuator operates the EGR control valve 52 in accordance with the EGR control valve control signal. That is, the EGR control valve actuator inputs the operation amount in accordance with the EGR control valve control signal (hereinafter, the operation amount will be referred to as an 'EGR control valve operation amount') to the EGR control valve 52.

Here, when the EGR ratio deviation is a positive value, that is, the actual EGR ratio is smaller than the target EGR ratio, the EGR control valve actuator operates the EGR control valve 52 so that the opening degree of the EGR control valve increases. Accordingly, the actual EGR ratio increases. On the other hand, when the EGR ratio deviation is a negative value, that is, the actual EGR ratio is larger than the target EGR ratio, the EGR control valve actuator operates the EGR control valve 52 so that the opening degree of the EGR control valve decreases. Accordingly, the actual EGR ratio decreases.

Next, the setting of the target supercharging pressure and the target EGR ratio will be described.

Figure 3:
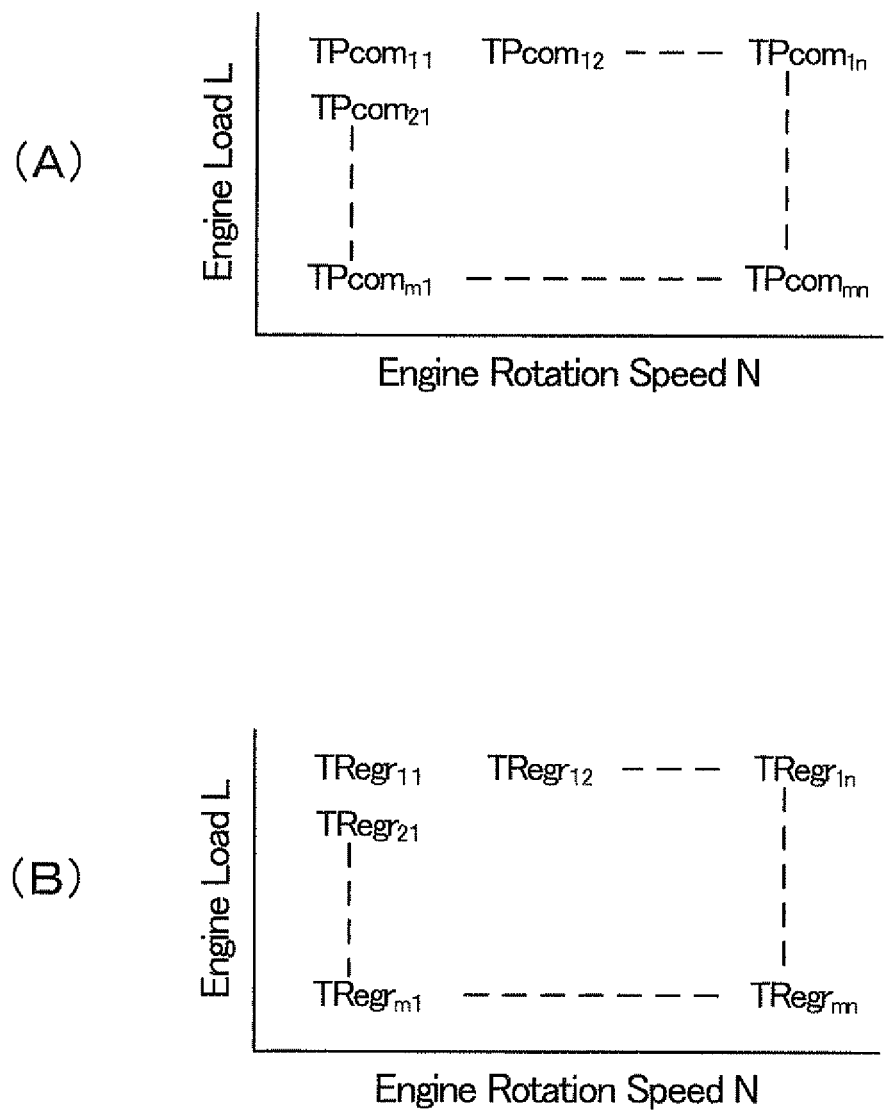
FIG. 3(A) is a diagram illustrating a map which is used to determine a target supercharging pressure.
FIG. 3(B) is a diagram illustrating a map which is used to determine a target EGR ratio.

In the supercharging pressure, there is an optimal supercharging pressure in accordance with the operation state of the internal combustion engine 10 (hereinafter, this will be referred to as an 'engine operation state'). Therefore, in the embodiment, as the engine operation state, the number of rotations of the engine and the load of the engine are employed, the optimal supercharging pressure is obtained in advance by an experiment or the like in accordance with the number of rotations of the engine and the load of the engine, and the obtained supercharging pressure is recorded as a target supercharging pressure TPcom in the electronic control device 60 in the form of a map of a function of an engine rotation speed N and an engine load L as illustrated in FIG. 3(A). Then, the target supercharging pressure TPcom is determined based on the engine rotation speed N and the engine load L from the map of FIG. 3(A).

Further, even in the EGR ratio, there is the optimal EGR ratio in accordance with the engine operation state. Therefore, in the embodiment, as the engine operation state, the number of rotations of the engine and the load of the engine are employed, the optimal EGR ratio is obtained in advance by an experiment or the like in accordance with the number of rotations of the engine and the load of the engine, and the obtained EGR ratio is recorded as the target EGR ratio TRegr in the electronic control device 60 in the form of a map of a function of the engine rotation speed N and the engine load L as illustrated in FIG. 3(B). Then, the target supercharging pressure TRegr is determined based on the engine rotation speed N and the load of the engine from the map of FIG. 3(B).

Incidentally, the deviation of the actual air intake pressure Pcom with respect to the target supercharging pressure TPcom determined in this way (that is, the supercharging pressure deviation) TPcom−Pcom is transformed into the vane control signal in accordance with the supercharging pressure deviation transformation rule as described above, and when the operation state of the vane 35d is controlled by the vane actuator 35e in accordance with the vane control signal, finally, it is controlled that the supercharging pressure becomes the target supercharging pressure. Incidentally, when the target supercharging pressure TPcom determined from the map of FIG. 3(A) is directly used in the control of the supercharging pressure, several problems occur.

That is, for example, when the actual supercharging pressure is lower than the target supercharging pressure, as described above, the electronic control device 60 generates a control signal (that is, a vane control signal) which enables the vane actuator 35e to operate the vane 35d so that the vane opening degree decreases in accordance with the deviation of the actual supercharging pressure with respect to the target supercharging pressure (that is, the supercharging pressure deviation). Then, the generated vane control signal is given from the electronic control device 60 to the vane actuator 35e, and the vane actuator 35e operates the vane 35d in accordance with the given vane control signal.

Incidentally, at this time, the supercharging pressure may largely exceed the target supercharging pressure during a process in which control is performed so that the supercharging pressure becomes the target supercharging pressure in accordance with the engine operation state including the EGR ratio and the like. In particular, since the vane actuator 35e largely operates the vane 35d when the actual supercharging pressure is largely lower than the target supercharging pressure, there is an increasing possibility that the supercharging pressure largely exceeds the target supercharging pressure. However, there is a need to prevent an accident that the supercharging pressure largely exceeds the target supercharging pressure in this way. In short, when control is performed so that the supercharging pressure becomes the target supercharging pressure, the supercharging pressure needs to be present in the allowable range even when it exceeds the target supercharging pressure.

Further, in order to prevent a misfire from being generated in the combustion chamber, for example, the concentration of oxygen in the gas brought into the combustion chamber needs to be maintained at a certain degree or more of concentration. Then, the concentration of oxygen in the gas brought into the combustion chamber changes in accordance with the EGR ratio, and the EGR ratio changes in accordance with the supercharging pressure. Accordingly, in the case where control is performed so that the supercharging pressure becomes the target supercharging pressure, it is natural that the supercharging pressure is controlled so that the concentration of oxygen in the gas brought into the combustion chamber becomes a certain degree or more of concentration.

In this way, in the control of the supercharging pressure, there is a constraint related to the supercharging pressure as the parameter to be controlled.

Further, the operable range of the vane 35d (that is, the rotatable range of the vane 35d) has a limitation in structure. For this reason, if the operation state of the vane 35d reaches the limit of the operable range even when the vane actuator 35e operates the vane 35d in order to decrease the vane opening degree, the vane actuator 35e may not operate the vane 35d anymore. Furthermore, when the vane actuator 35e is to operate the vane 35d in such a state, the failure of the vane 35 may be caused. Further, when the failure of the vane 35d needs to be more reliably prevented, it is natural that the operation of the vane 35d is limited within the range narrower than the operable range. In short, when control is performed so that the supercharging pressure becomes the target supercharging pressure, the operation of the vane 35d also needs to be limited within the allowable range which is determined from various viewpoints. In this way, in the control of the supercharging pressure, there is also a constraint related to the operation state of the vane 35d as an object to be controlled.

Furthermore, the operable range of the vane actuator 35e has a limitation in structure. For this reason, if the vane actuator 35e reaches the limit of the operable range even when the vane actuator 35e operates the vane 35d in order to decrease the vane opening degree, the vane actuator 35e may not operate the vane 35d anymore. Furthermore, when the vane actuator 35e is about to operate the vane 35d in such a state, the failure of the vane actuator 35e may be caused. Further, when the failure of the vane actuator 35e needs to be prevented more reliably, it is natural that the operation of the vane actuator 35e is limited within a range narrower than the operable range of the vane actuator 35e. In short, when control is performed so that the supercharging pressure becomes the target supercharging pressure, it is natural that the operation of the vane actuator 35e also needs to be limited within the allowable range which is determined from various viewpoints. In this way, in the control of the supercharging pressure, there is also a constraint related to the operation state of the vane actuator 35e as a means which controls the operation of the vane 35d.

Furthermore, in the vane operation amount (that is, the operation amount input from the vane actuator 35e to the vane 35d), there is an appropriate operation amount when the performance of the vane actuator 35e and the performance of the vane 35d are taken into consideration. In short, when control is performed so that the supercharging pressure becomes the target supercharging pressure, it is natural that the vane operation amount is also limited within the allowable range which is determined from various viewpoints. In this way, in the control of the supercharging pressure, there is also a constraint related to the vane operation amount.

Of course, the same applies to the case where the vane actuator 35e operates the vane 35d by performing control so that the supercharging pressure becomes the target supercharging pressure when the actual supercharging pressure is higher than the target supercharging pressure.

In this way, in the control of the supercharging pressure, there are a constraint provided for the supercharging pressure so that the supercharging pressure is in the allowable range, a constraint provided for the operation state of the vane 35d so that the operation of the vane 35d is limited within the allowable range, a constraint provided for the operation state of the vane actuator 35e so that the operation of the vane actuator 35e is limited within the allowable range, and a constraint provided for the vane operation amount so that the vane operation amount is limited within the allowable range. Accordingly, if it is expected that the constraints are not satisfied when the target supercharging pressure TPcom determined from the map of FIG. 3(A) is directly used in the control of the supercharging pressure, it is natural that the target supercharging pressure TPcom determined from the map of FIG. 3(A) is corrected so as to satisfy the constraints and the corrected target supercharging pressure is used in the control of the supercharging pressure.

Further, the same applies to the control of the EGR ratio. That is, the deviation (that is, the EGR ratio deviation) TRegr−Regr of the actual EGR ratio Regr with respect to the target EGR ratio TRegr determined from the map of FIG. 3(B) is transformed into the EGR control valve control signal in accordance with the EGR ratio deviation transformation rule as described above, and when the operation state of the EGR control valve 52 is controlled by the EGR control valve actuator in accordance with the EGR control valve control signal, finally, it is controlled that the EGR ratio becomes the target EGR ratio. Incidentally, when the target EGR ratio TRegr determined from the map of FIG. 3(B) is directly used in the control of the EGR ratio in this way, several problems occur.

That is, for example, when the actual EGR ratio is smaller than the target EGR ratio, as described above, the electronic control device 60 generates a signal (that is, an EGR control valve control signal) which enables the EGR control valve actuator to operate the EGR control valve 52 so that the opening degree of the EGR control valve increases in accordance with the deviation of the actual EGR ratio with respect to the target EGR ratio (that is, the EGR ratio deviation). Then, the generated EGR control valve control signal is given from the electronic control device 60 to the EGR control valve actuator, and the EGR control valve actuator operates the EGR control valve 52 in accordance with the given EGR control valve control signal.

Incidentally, at this time, the EGR ratio may largely exceed the target EGR ratio during a process in which control is performed so that the EGR ratio becomes the target EGR ratio in accordance with the engine operation state including the supercharging pressure and the like. In particular, since the EGR control valve actuator largely operates the EGR control valve 52 when the actual EGR ratio is largely smaller than the target EGR ratio, there is an increasing possibility that the EGR ratio largely exceeds the target EGR ratio. However, there is a need to prevent an accident that the EGR ratio largely exceeds the target EGR ratio in this way. In short, when control is performed so that the EGR ratio becomes the target supercharging pressure, the EGR ratio needs to be present in the allowable range even when it exceeds the target EGR ratio.

Further, in order to prevent a misfire from being generated in the combustion chamber, for example, the concentration of oxygen in the gas brought into the combustion chamber needs to be maintained at a certain degree or more of concentration. Then, the concentration of oxygen in the gas brought into the combustion chamber changes in accordance with the EGR ratio. Accordingly, in the case where control is performed so that the EGR ratio becomes the target EGR ratio, it is natural that the EGR ratio is controlled so that the concentration of oxygen in the gas brought into the combustion chamber becomes a certain degree or more of concentration.

In this way, in the control of the EGR ratio, there is a constraint related to the EGR ratio as the parameter to be controlled.

Further, the operable range of the EGR control valve 52 has a limitation in structure. For this reason, if the operation state of the EGR control valve 52 reaches the limit of the operable range even when the EGR control valve actuator operates the EGR control valve 52 in order to increase the opening degree of the EGR control valve, the EGR control valve actuator may not operate the EGR control valve 52 anymore. Furthermore, when the EGR control valve actuator is about operate the EGR control valve 52 in such a state, the failure of the EGR control valve 52 may be caused. Further, in order to more reliably prevent the failure of the EGR control valve 52, it is natural that the operation of the EGR control valve 52 is limited within the range narrower than the operable range. In short, in the case where control is performed so that the EGR ratio becomes the target EGR ratio, it is natural that the operation of the EGR control valve 52 is limited within the allowable range which is determined from various viewpoints. In this way, in the control of the EGR ratio, there is also a constraint related to the operation state of the EGR control valve 52 as an object to be controlled.

Furthermore, the operable range of the EGR control valve actuator also has a limitation in structure. For this reason, if the EGR control valve actuator reaches the limit of the operable range even when the EGR control valve actuator operates the EGR control valve 52 so as to increase the opening degree of the EGR control valve, the EGR control valve 52 may not be operated any more. Furthermore, when the EGR control valve actuator is about to operate the EGR control valve 52 in such a state, the failure of the EGR control valve actuator may be caused. Further, in order to more reliably prevent the failure of the EGR control valve actuator, it is natural that the operation of the EGR control valve actuator is limited within the range narrower than the operable range of the EGR control valve actuator. In short, in the case where control is performed so that the EGR ratio becomes the target EGR ratio, it is natural that the operation of the EGR control valve actuator is also limited within the allowable range from various viewpoints. In this way, in the control of the EGR ratio, there is also a constraint related to the operation state of the EGR control valve actuator as a means which controls the operation of the EGR control valve 52.

Furthermore, in the EGR control valve operation amount (that is, the operation amount input from the EGR control valve actuator to the EGR control valve 52), there is an appropriate operation amount when the performance of the EGR control valve actuator and the performance of the EGR control valve 52 are taken into consideration. In short, in the case where control is performed so that the EGR ratio becomes the target EGR ratio, it is natural that the EGR control valve operation amount is also limited within the allowable range which is determined from various viewpoints. In this way, in the control of the EGR ratio, there is also a constraint related to the operation amount of the EGR control valve.

Of course, the same applies to the case where the EGR control valve actuator operates the EGR control valve 52 by performing control so that the EGR ratio becomes the target EGR ratio when the actual EGR ratio is larger than the target EGR ratio.

In this way, in the control of the EGR ratio, there are a constraint provided for the EGR ratio so that the EGR ratio is in the allowable range, a constraint provided for the operation state of the EGR control valve 52 so that the operation of the EGR control valve 52 is limited within the allowable range, a constraint provided for the operation state of the EGR control valve actuator so that the operation of the EGR control valve actuator is limited within the allowable range, and a constraint provided for the operation amount of the EGR control valve so that the EGR control valve operation amount is limited within the allowable range. Accordingly, if it is expected that the constraints are not satisfied when the target EGR ratio TRegr determined from the map of FIG. 3(B) is directly used in the control of the EGR ratio, it is natural that the target EGR ratio TRegr determined from the map of FIG. 3(B) is corrected so as to satisfy the constraints and the corrected target EGR ratio is used in the control of the EGR ratio.

Furthermore, even when the opening degree of the EGR control valve is constant, if the vane opening degree changes, the supercharging pressure changes. Accordingly, in this case, the EGR gas amount changes a little, and the EGR ratio changes. That is, the control of the supercharging pressure influences the EGR ratio. On the other hand, if the opening degree of the EGR control valve changes even when the vane opening degree is constant, the EGR gas amount also changes. Accordingly, in this case, the pressure inside the air intake branch pipe 31 changes, and the supercharging pressure changes. That is, the control of the EGR ratio influences the supercharging pressure.

In this way, the control of the supercharging pressure and the control of the EGR ratio interfere with each other. Accordingly, in the case where control is performed so that the supercharging pressure becomes the target supercharging pressure, it is natural that the supercharging pressure is controlled in a state where the constraint related to the EGR ratio, the constraint related to the operation state of the EGR control valve 52, the constraint related to the operation state of the EGR control valve actuator, and the constraint condition related to the EGR control valve operation amount are satisfied. On the other hand, in the case where control is performed so that the EGR ratio becomes the target EGR ratio, it is natural that the EGR ratio is controlled in a state where the constraint related to the supercharging pressure, the constraint related to the operation state of the vane 35d, the constraint related to the operation state of the vane actuator 35e, and the constraint related to the vane operation amount are satisfied. That is, in the case where the control of the supercharging pressure and the control of the EGR ratio are performed, it is natural that the supercharging pressure and the EGR ratio are controlled in a state where the above-described constraints are all satisfied.

Therefore, in the control device of the embodiment, the target supercharging pressure determined from the map of FIG. 3(A) is corrected and the target EGR ratio determined from the map of FIG. 3(B) is corrected so that the constraint related to the supercharging pressure, the constraint related to the operation state of the vane 35d, the constraint related to the operation state of the vane actuator 35e, the constraint related to the vane operation amount, the constraint related to the EGR ratio, the constraint related to the operation state of the EGR control valve 52, the constraint related to the operation state of the EGR control valve actuator, and the constraint related to the operation amount of the EGR control valve are all satisfied. Then, the corrected target supercharging pressure is used in the control of the supercharging pressure, and the corrected target EGR ratio is used in the control of the EGR ratio.

More specifically, in the control device of the embodiment, the target supercharging pressure TPcom is determined based on the engine rotation speed N and the engine load L from the map of FIG. 3(A), and the target EGR ratio TRegr is determined based on the engine rotation speed N and the engine load L from the map of FIG. 3(B). Then, the actual supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount obtained when the vane 35d and the EGR control valve 52 are operated as described above based on the target supercharging pressure TPcom and the target EGR ratio TRegr are estimated before the vane 35d and the EGR control valve 52 are actually operated as described above based on the target supercharging pressure TPcom and the target EGR ratio TRegr.

Then, it is determined whether the supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount which are estimated satisfy the constraint related to the supercharging pressure, the constraint related to the operation state of the vane 35d, the constraint related to the operation state of the vane actuator 35e, the constraint related to the vane operation amount, the constraint related to the EGR ratio, the constraint related to the operation state of the EGR control valve 52, the constraint related to the operation state of the EGR control valve actuator, and the constraint related to the operation amount of the EGR control valve.

That is, it is determined whether the constraint condition is satisfied in which the estimated supercharging pressure is in the allowable range, it is determined whether the constraint condition is satisfied in which the estimated operation state of the vane 35d is in the allowable range, it is determined whether the constraint condition is satisfied in which the estimated operation state of the vane actuator 35e is in the allowable range, it is determined whether the constraint condition is satisfied in which the estimated vane operation amount is in the allowable range, it is determined whether the constraint condition is satisfied in which the estimated EGR ratio is in the allowable range, it is determined whether the constraint condition is satisfied in which the estimated operation state of the EGR control valve 52 is in the allowable range, it is determined whether the constraint condition is satisfied in which the estimated operation state of the EGR control valve actuator is in the allowable range, and it is determined whether the constraint condition is satisfied in which the estimated EGR control valve operation amount is in the allowable range.

Then, when the constraint condition is satisfied, the target supercharging pressure TPcom determined from the map of FIG. 3(A) is directly set as the target supercharging pressure for the control of the supercharging pressure, and the target EGR ratio TRegr determined from the map of FIG. 3(B) is directly set as the target EGR ratio for the control of the EGR ratio.

Then, the vane actuator 35e operates the vane 35d in accordance with the vane control signal which is calculated as described above based on the target supercharging pressure set in this way, and the EGR control valve actuator operates the EGR control valve 52 in accordance with the EGR control valve control signal which is calculated as described above based on the target EGR ratio set in this way.

On the other hand, when the constraint condition is not satisfied, the target supercharging pressure TPcom determined from the map of FIG. 3(A) and the target EGR ratio TRegr determined from the map of FIG. 3(B) are corrected in accordance with the predetermined rule.

Then, the actual supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount obtained when the vane 35d and the EGR control valve 52 are actually operated based on the corrected target supercharging pressure TPcom and the corrected target EGR ratio TRegr are estimated again. Then, it is determined whether the supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount which are estimated satisfy the constraint condition.

Here, when the constraint condition is satisfied, the corrected target supercharging pressure is set as the target supercharging pressure for the control of the supercharging pressure, and the vane actuator 35e operates the vane 35d in accordance with the vane control signal calculated as described above based on the set target supercharging pressure. Also, the corrected target EGR ratio is set as the target EGR ratio for the control of the EGR ratio, and the EGR control valve actuator operates the EGR control valve 52 in accordance with the EGR control valve control signal calculated as described above based on the set target EGR ratio.

On the other hand, even in this case, when the constraint condition is not satisfied, the corrected target supercharging pressure is further corrected in accordance with the predetermined rule, and the corrected target EGR ratio is further corrected in accordance with the predetermined rule. Then, the actual supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount obtained when the vane 35d and the EGR control valve 52 are actually operated based on the further corrected target supercharging pressure and the further corrected target EGR ratio are estimated again. Then, it is determined whether the estimated supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount satisfy the constraint condition.

In the control device of the embodiment, the correction of the target supercharging pressure and the target EGR ratio, the estimation of the actual supercharging pressure, the operation state of the vane 35d, the operation state of the vane actuator 35e, the vane operation amount, the actual EGR ratio, the operation state of the EGR control valve 52, the operation state of the EGR control valve actuator, and the estimation of the EGR control valve operation amount when the vane 35d and the EGR control valve 52 are operated based on the corrected target supercharging pressure and the corrected target EGR ratio, and the determination on whether the supercharging pressure, the operation state of the vane 35d, the operation state of the vane actuator 35e, the vane operation amount, the actual EGR ratio, the operation state of the EGR control valve 52, the operation state of the EGR control valve actuator, and the EGR control valve operation amount which are estimated satisfy the constraint condition are repeated until it is determined that the constraint condition is satisfied.

In this way, according to the control device of the embodiment, the supercharging pressure and the EGR ratio are controlled in a state where the constraint condition related to the supercharging pressure, the constraint condition related to the EGR ratio, the constraint condition related to the operation state of the vane, the constraint condition related to the operation state of the EGR control valve, the constraint condition related to the vane operation amount, the constraint condition related to the EGR control valve operation amount, the constraint condition related to the operation state of the vane actuator, and the constraint condition related to the operation state of the EGR control valve actuator are satisfied. For this reason, the supercharging pressure and the EGR ratio are controlled so as to be appropriate for the control of the supercharging pressure, the control of the EGR ratio, the control of the operation of the vane, the control of the operation of the EGR control valve, the determination of the vane operation amount, the determination of the EGR control valve operation amount, the control of the operation of the vane actuator, and the control of the operation of the EGR control valve actuator.

Further, according to the control device of the embodiment, since the supercharging pressure and the EGR ratio are controlled so that the constraint condition related to the vane operation amount and the EGR control valve operation amount is satisfied, an antiwindup effect is obtained. For this reason, the control response of the supercharging pressure and the EGR ratio may be more satisfactory in a process in which control is performed so that the supercharging pressure and the EGR ratio respectively become the target supercharging pressure and the target EGR ratio (that is, the transient state).

Further, according to the control device of the embodiment, the supercharging pressure and the EGR ratio are controlled in a state where the constraint conditions for the vane and the EGR control valve and the constraint conditions for the vane actuator and the EGR control valve actuator are satisfied. For this reason, the safety and the robustness of the control of the supercharging pressure and the EGR ratio may be high.

Further, according to the control device of the embodiment, the supercharging pressure and the EGR ratio are controlled in a state where the above-described constraint conditions are all satisfied. Accordingly, in a process in which control is performed so that the supercharging pressure and the EGR ratio respectively become the target supercharging pressure and the target EGR ratio, the supercharging pressure is prevented from becoming higher than or lower than the allowable degree of the target supercharging pressure, the failure of the vane $35d$ is prevented, the failure of the vane actuator $35e$ is prevented, the EGR ratio is prevented from becoming higher than or lower than the allowable degree of the target EGR ratio, the failure of the EGR control valve $52$ is prevented, and the failure of the EGR control valve actuator is prevented. That is, the supercharging pressure and the EGR ratio are controlled in an appropriate state.

Furthermore, the above-described concept for the control of the supercharging pressure and the EGR ratio may be applied to not only the case where the supercharging pressure and the EGR ratio are controlled at the same time, but also the case where plural parameters to be controlled in the internal combustion engine $10$ are controlled at the same time. That is, for example, in the internal combustion engine $10$, the amount of air brought into the combustion chamber (hereinafter, the amount of air will be referred to as an 'air intake amount') may be controlled by the throttle valve $33$, but even when the air intake amount is controlled along with the supercharging pressure and the EGR ratio, the above-described concept may be applied. Further, for example, when the internal combustion engine $10$ includes another EGR device which introduces an exhaust gas from the exhaust pipe $42$ on the downstream side of the exhaust turbine $35b$ of the supercharger $35$ to the air intake pipe $32$ on the upstream side of the compressor $35a$ of the supercharger $35$ in addition to the EGR device $50$ of the above-described embodiment, the above-described concept may be applied even when the amount of the exhaust gas introduced into the air intake pipe $32$ is controlled by another EGR device and the amount of the exhaust gas introduced into the air intake branch pipe $31$ is controlled by the EGR device $50$ of the above-described embodiment.

Furthermore, in the above-described embodiment, the vane and the EGR control valve are control objects to be controlled in the internal combustion engine. Then, the concept of the above-described embodiment may also be applied to the case where the control object (that is, the constituent of the internal combustion engine) other than the vane and the EGR control valve is controlled. Accordingly, the above-described embodiment may be in a broad sense understood that the control objects such as the vane and the EGR control valve are controlled.

Further, in the above-described embodiment, the supercharging pressure and the EGR ratio are control amounts to be controlled in the internal combustion engine. Then, the concept of the above-described embodiment may also be applied to the case where the control amount other than the supercharging pressure and the EGR ratio is controlled. Accordingly, the above-described embodiment may be in a broad sense understood that the control amounts such as the supercharging pressure and the EGR ratio are controlled.

Further, in the above-described embodiment, the electronic control device determines the target supercharging pressure and the target EGR ratio as the initial target value of the supercharging pressure and the initial target value of the EGR ratio from the maps of FIGS. 3(A) and 3(B). Accordingly, it may be understood that the electronic control device serves as an initial target value determination means.

Further, in the above-described embodiment, the electronic control device corrects the target supercharging pressure and the target EGR ratio determined from the maps of FIGS. 3(A) and 3(B), and outputs the corrected target supercharging pressure and the corrected target EGR ratio as the correction target values of the supercharging pressure and the EGR ratio. Accordingly, it may be understood that the electronic control device serves as a correction target value output means.

Further, in the above-described embodiment, the electronic control device generates the vane control signal which enables the vane actuator to operate the vane in accordance with the deviation of the actual supercharging pressure with respect to the target supercharging pressure (that is, the supercharging pressure deviation), and generates the EGR control valve control signal which enables the EGR control valve actuator to operate the EGR control valve in accordance with the deviation of the actual EGR ratio with respect to the target EGR ratio (that is, the EGR ratio deviation). Then, the vane actuator and the EGR control valve actuator operate the vane and the EGR control valve in accordance with the vane control signal and the EGR control valve control signal. That is, the vane actuator and the EGR control valve actuator give the operation amounts to the vane and the EGR control valve in accordance with the vane control signal and the EGR control valve control signal. Accordingly, it may be understood that the electronic control device serves as an operation amount determination means which determines the operation amounts to be input to the vane and the EGR control valve in accordance with the target supercharging pressure and the target EGR ratio.

Of course, in the above-described embodiment, since the electronic control device generates the vane control signal which enables the vane actuator to operate the vane in accordance with the deviation of the actual supercharging pressure with respect to the target supercharging pressure (that is, the supercharging pressure deviation) and generates the EGR control valve control signal which enables the EGR control valve actuator to operate the EGR control valve in accordance with the deviation of the actual EGR ratio with respect to the target EGR ratio (that is, the EGR ratio deviation), it may be understood that the electronic control device serves as a control signal generation means.

Further, in the above-described embodiment, the electronic control device performs the control process in which the target supercharging pressure is input as the control target value for the control of the supercharging pressure, the vane operation amount to be input to the vane in accordance with the input target supercharging pressure is determined, the target EGR ratio is input as the control target value for the control of the EGR ratio, and the EGR control valve operation amount to be input to the EGR control valve in accordance with the input target EGR ratio is determined. Accordingly, it may be understood that the electronic control device serves as a control process execution means which executes the control process.

Further, in the above-described embodiment, the electronic control device determines whether the constraint condition is satisfied when the vane operation amount in which the target supercharging pressure determined from the map of FIG. 3(A) is determined as the target supercharging pressure in the control of the actual supercharging pressure is input to the vane and the EGR control valve operation amount in which the target EGR ratio determined from the map of FIG. 3(B) is determined as the target EGR ratio in the control of the actual EGR ratio is input to the EGR control valve. Further, in the above-described embodiment, the electronic control device determines whether the constraint condition is satisfied when the vane operation amount in which the corrected target supercharging pressure is determined as the target supercharging pressure in the control of the actual supercharging pressure is input to the vane and the EGR control valve operation amount in which the corrected target EGR ratio is determined as the target EGR ratio in the control of the actual EGR ratio is input to the EGR control valve. Accordingly, it may be understood that the electronic control device serves as a determination means which determines whether the constraint condition is satisfied.

Further, in the above-described embodiment, when it is determined that the constraint condition is satisfied when the supercharging pressure and the EGR ratio are controlled in accordance with the vane operation amount (or the vane control signal) and the EGR control valve operation amount (or the EGR control valve control signal) determined based on the target supercharging pressure and the target EGR ratio determined as the initial target values from the maps of FIGS. 3(A) and 3(B), the electronic control device inputs the target supercharging pressure and the target EGR ratio as the target values in the control of the actual supercharging pressure and the actual EGR ratio to the control process. Accordingly, it may be understood that the electronic control device serves as an initial target value input means.

Further, in the above-described embodiment, when it is determined that the constraint condition is satisfied based on the corrected target supercharging pressure and the corrected target EGR ratio, the electronic control device inputs the corrected target supercharging pressure and the corrected target EGR ratio as the target values in the control of the actual supercharging pressure and the actual EGR ratio to the control process. Accordingly, it may be understood that the electronic control device serves as a correction target value input means.

Further, in the above-described embodiment, the vane actuator and the EGR control valve actuator respectively control the operations of the vane and the EGR control valve. Accordingly, the vane actuator and the EGR control valve are operation control means which respectively control the operations of the vane and the EGR control valve. Then, the concept of the above-described embodiment may also be applied to the case where the operation of the control object is controlled by the actuator other than the vane actuator and the EGR control valve. Accordingly, the above-described embodiment may be in a broad sense understood that the operation of the control object is controlled by the operation control means such as the vane actuator and the EGR control valve actuator.

Further, in the above-described embodiment, the target supercharging pressure and the target EGR ratio are corrected so that the constraint condition related to the supercharging pressure, the constraint condition related to the EGR ratio, the constraint condition related to the operation state of the vane, the constraint condition related to the operation state of the EGR control valve, the constraint condition related to the vane operation amount, the constraint condition related to the EGR control valve operation amount, the constraint condition related to the operation state of the vane actuator, and the constraint condition related to the operation state of the EGR control valve actuator are all satisfied. Then, the concept of the above-described embodiment may also be applied to the case where the constituent of the internal combustion engine other than the vane and the EGR control valve is set as the control object, the parameter other than the supercharging pressure and the EGR ratio is set as the control amount of the control object, and the actuator other than the vane actuator and the EGR control valve actuator is set as the operation control means. Accordingly, the above-described embodiment may be in a broad sense understood that the target value of the control amount is satisfied so that the constraint condition related to the control amount, the constraint condition related to the operation state of the control object, the constraint condition related to the operation amount to be input to the control object, and the constraint condition related to the operation state of the operation control means are all satisfied.

Furthermore, in the above-described embodiment, the target supercharging pressure and the target EGR ratio are corrected so that the control conditions are all satisfied. However, in the above-described embodiment, the target supercharging pressure and the target EGR ratio may be corrected so that at least one of the constraint condition related to the supercharging pressure, the constraint condition related to the operation state of the vane, the constraint condition related to the vane operation amount, and the constraint condition related to the operation state of the vane actuator and at least one of the constraint condition related to the EGR ratio, the constraint condition related to the operation state of the EGR control valve, the constraint condition related to the EGR control valve operation amount, and the constraint condition related to the operation state of the EGR control valve actuator are satisfied. Then, the concept of the above-described embodiment may be applied to the case where the constituent of the internal combustion engine other than the vane and the EGR control valve is set as the control object, the parameter other than the supercharging pressure and the EGR ratio is set as the control amount of the control object, and the actuator other than the vane actuator and the EGR control valve actuator is set as the operation control means. Accordingly, the above-described embodiment may be in a broad sense understood that the target value of the first control amount and the target value of the second control amount are corrected so that at least one of the constraint condition related to the control amount of the first control object of the internal combustion engine, the constraint condition related to the operation state of the first control object, the constraint condition related to the operation amount to be input to the first control object, and the constraint condition related to the operation state of the first operation control means controlling the operation of the first control object and at least one of the constraint condition related to the control amount of the second control object of the internal combustion engine, the constraint condition related to the operation state of the second control object, the constraint condition related to the operation amount to be input to the second control object, and the constraint condition related to the operation state of the second operation control means controlling the operation of the second control object are satisfied.

Furthermore, in the above-described embodiment, the constraint condition related to the supercharging pressure indicates that the supercharging pressure is in the allowable range. However, when there is a constraint condition given to the supercharging pressure other than the constraint condition in which the supercharging pressure is in the allowable range in consideration of the control of the supercharging pressure, the control of the EGR ratio, the control of the operation of the vane, the control of the operation of the EGR control valve, the determination of the vane operation amount, the determination of the EGR control valve operation amount, the control of the operation of the vane actuator, and the control of the operation of the EGR control valve actuator (hereinafter, the control and the determination are generally referred to as 'various types of control related to the control amount of the control object'), the constraint condition to be applied may be employed in addition to or instead of the constraint condition in which the supercharging pressure is in the allowable range.

Similarly, in the above-described embodiment, the constraint condition related to the EGR ratio indicates that the EGR ratio is in the allowable range. However, when there is a constraint condition given to the EGR ratio other than the constraint condition in which the EGR ratio is in the allowable range in consideration of various types of control related to the control amount of the control object, the constraint condition to be applied may be employed instead of or in addition to the constraint condition in which the EGR ratio is in the allowable range.

Similarly, in the above-described embodiment, the constraint condition related to the operation state of the vane indicates that the operation state of the vane is in the allowable range. However, when there is a constraint condition given to the operation state of the vane other than the constraint condition in which the operation state of the vane is in the allowable range in consideration of various types of control related to the control amount of the control object, the constraint condition to be applied may be employed instead of or in addition to the constraint condition in which the operation state of the vane is in the allowable range. Accordingly, in a broad sense, in the above-described embodiment, the constraint condition related to the vane may be employed.

Similarly, in the above-described embodiment, the constraint condition related to the operation state of the EGR control valve indicates that the operation state of the EGR control valve is in the allowable range. However, when there is a constraint condition given to the operation state of the EGR control valve other than the constraint condition in which the operation state of the EGR control valve is in the allowable range in consideration of various types of control related to the control amount of the control object, the constraint condition to be applied may be employed instead of or in addition to the constraint condition in which the operation state of the EGR control valve is in the allowable range. Accordingly, in a broad sense, in the above-described embodiment, the constraint condition related to the EGR control valve may be employed.

Furthermore, in the above-described embodiment, the constraint condition related to the operation state of the vane and the constraint condition related to the operation state of the EGR control valve are considered when the target supercharging pressure and the target EGR ratio are corrected. However, in the above-described embodiment, when there are a constraint related to the vane and the constraint condition related to the EGR control valve to be considered other than the constraint condition related to the operation state of the vane and the constraint condition related to the operation state of the EGR control valve, the constraint conditions may be considered when the target supercharging pressure and the target EGR ratio are corrected. Then, the concept of the above-described embodiment may also be applied to the case where the constituent of the internal combustion engine other than the vane and the EGR control valve is set as the control object. Accordingly, the above-described embodiment may be in a broad sense understood that the target value of the control amount of the first control object and the target value of the control amount of the second control object are corrected so that the constraint condition related to the first control object of the internal combustion engine and the constraint condition related to the second control object of the internal combustion engine are satisfied.

Similarly, in the above-described embodiment, the constraint condition related to the operation state of the vane actuator indicates that the operation state of the vane actuator is in the allowable range. However, when there is a constraint condition given to the operation state of the vane actuator other than the constraint condition in which the operation state of the vane actuator is in the allowable range in consideration of various types of control related to the control amount of the control object, the constraint condition to be applied may be employed instead of or in addition to the constraint condition in which the operation state of the vane actuator is in the allowable range. Accordingly, in a broad sense, in the above-described embodiment, the constraint condition related to the vane actuator may be employed.

Similarly, in the above-described embodiment, the constraint condition related to the operation state of the EGR control valve actuator indicates that the operation state of the EGR control valve actuator is in the allowable range. However, when there is a constraint condition given to the operation state of the EGR control valve actuator other than the constraint condition in which the operation state of the EGR control valve actuator is in the allowable range in consideration of various types of control related to the control amount of the control object, the constraint condition to be applied may be employed instead of or in addition to the constraint condition in which the operation state of the EGR control valve actuator is in the allowable range. Accordingly, in a broad sense, in the above-described embodiment, the constraint condition related to the EGR control valve actuator may be employed.

Furthermore, in the above-described embodiment, the constraint condition related to the operation state of the vane actuator and the constraint condition related to the operation state of the EGR control valve actuator are considered when correcting the target supercharging pressure and the target EGR ratio. However, in the above-described embodiment, when there are a constraint condition related to the vane actuator and a constraint condition related to the EGR control valve actuator to be considered other than the constraint of the operation state of the vane actuator and the constraint of the operation state of the EGR control valve actuator, the constraint conditions may be considered when correcting the target supercharging pressure and the target EGR ratio. Then, the concept of the above-described embodiment may also be applied to the case where the actuator other than the vane actuator and the EGR control valve actuator is set as the operation control means. Accordingly, the above-described embodiment may be in a broad sense understood that the target value of the control amount of the first control object and the target value of the control amount of the second control object are corrected so as to satisfy the constraint condition related to the first operation control means controlling the operation of the first control object of the internal combustion engine and the constraint condition related to the second operation control means controlling the operation of the second control object of the internal combustion engine.

Similarly, in the above-described embodiment, the constraint condition related to the vane operation amount indicates that the vane operation amount is in the allowable range. However, when there is a constraint condition given to the vane operation amount other than the constraint condition in which the vane operation amount is in the allowable range in consideration of various types of control related to the control amount of the control object, the constraint condition to be applied may be employed instead of or in addition to the constraint condition in which the vane operation amount is in the allowable range.

Similarly, in the above-described embodiment, the constraint condition related to the EGR control valve operation amount indicates that the EGR control valve operation amount is in the allowable range. However, when there is a constraint condition given to the EGR control valve operation amount other than the constraint condition in which the EGR control valve operation amount is in the allowable range in consideration of various types of control related to the control amount of the control object, the constraint condition to be applied may be employed instead of or in addition to the constraint condition in which the EGR control valve operation amount is in the allowable range.

Further, in the above-described embodiment, the constraint condition indicates the constraint conditions related to the supercharging pressure, the EGR ratio, the vane, the EGR control valve, the vane operation amount, the EGR control valve operation amount, the vane actuator, and the EGR control valve actuator. However, when there is a constraint condition to be applied instead of the constraint condition, the constraint condition to be applied may be employed instead of or in addition to the constraint condition. Accordingly, in a broad sense, in the above-described embodiment, the constraint condition related to the internal combustion engine may be employed.

Further, in the control device of the above-described embodiment, the corrected target supercharging pressure and the corrected target EGR ratio which are used in the control of the actual supercharging pressure and the actual EGR ratio may satisfy all constraint conditions described above when the supercharging pressure and the EGR ratio are actually controlled based on at least the target supercharging pressure and the target EGR ratio. However, since the target supercharging pressure and the target EGR ratio determined from the maps of FIGS. 3(A) and 3(B) are optimal values in the engine operation state, in a state where the corrected target supercharging pressure and the corrected target EGR ratio which are used in the control of the actual supercharging pressure and the actual EGR ratio are largely different from the target supercharging pressure and the target EGR ratio determined from the maps of FIGS. 3(A) and 3(B), there is a possibility that a large variation in output torque (that is, torque shock) or degradation in drivability may be caused, which is undesirable in the engine operation state. Accordingly, in the control device of the above-described embodiment, when there are plural corrected target supercharging pressures and plural corrected target EGR ratios satisfying all constraint conditions described above, it is desirable to employ the target supercharging pressure and the target EGR ratio which are closest to the target supercharging pressure and the target EGR ratio determined from the maps of FIGS. 3(A) and 3(B) among the target supercharging pressures and the target EGR ratios.

Further, in the above-described embodiment, it may be understood that the vane is a pressure control valve which controls the degree increasing the pressure of air brought into the combustion chamber. Further, in the above-described embodiment, it may be understood that the EGR control valve is an exhaust gas amount control valve which controls the amount of the exhaust gas introduced into the air intake passage of the internal combustion engine.

Next, in the control device of the above-described embodiment, a specific example of a technique of obtaining the target supercharging pressure and the target EGR ratio satisfying all constraint conditions described above based on the target supercharging pressure and the target EGR ratio determined from the maps of FIGS. 3(A) and 3(B) will be introduced.

When plural constituents of the internal combustion engine are set as control objects, the internal state of the internal combustion engine at the current time is indicated by the internal state vector 'x', and the operation amount input to each control object so as to control the control amount of each control object at the corresponding target value is indicated by the operation amount vector 'u', the state vector 'x⁺' indicating the internal state of the internal combustion engine, that is, the internal state of the internal combustion engine at the next time when the operation amount is input to each corresponding control object may be expressed by the state equation of the following equation 1 using the constant matrixes (or the coefficient matrixes) A and B.

$$x^+ = Ax + Bu \quad (1)$$

Further, the control amount vector 'y' indicating the control amount output from each control object when the corresponding operation amount is input to each control object so as to control the control amount of each control object at the corresponding target value may be expressed by the output equation of the following equation 2 using the constant matrixes (or the coefficient matrixes) C and D.

$$y = Cx + Du \quad (2)$$

Here, the vector (hereinafter, the vector will be referred to as a 'subject restraining signal vector') 'c' indicating the constraint related to the internal state vector x, the constraint related to the operation amount vector u, and the constraint related to the control amount vector y is defined as the following equation 3.

$$c = \begin{bmatrix} u \\ y \\ x \end{bmatrix} \quad (3)$$

Then, when the subject restraining signal vector c is defined as the above-described equation 3, the subject restraining signal vector c is expressed by the following equation 4 from the above-described equation 1 and the above-described equation 2.

$$c = \begin{bmatrix} 0 \\ C \\ I \end{bmatrix} x + \begin{bmatrix} I \\ D \\ 0 \end{bmatrix} u \quad (4)$$

Here, the constant matrix (or the coefficient matrix) Cc is defined as the following equation 5, and the constant matrix (or the coefficient matrix) Dc is defined as the following equation 6.

$$C_c = \begin{bmatrix} 0 \\ C \\ I \end{bmatrix} \quad (5)$$

$$D_c = \begin{bmatrix} I \\ D \\ 0 \end{bmatrix} \quad (6)$$

Then, when the constant matrixes Cc and Dc are defined as the above-described equation 5 and the above-described equation 6, the above-described equation 4 is expressed by the following equation 7.

$$c = C_c x + D_c u \quad (7)$$

In this way, the state space model related to the control object is expressed as the above-described equation 1, the above-described equation 2, and the above-described equation 7.

Here, it is defined that the constraint related to the internal state of each control object indicated by the internal state vector x is indicated by the bounded closed set 'X', the constraint related to the operation amount input to each control object and indicated by the operation amount vector u is indicated by the bounded closed set 'U', the constraint related to the control amount output from each control object and indicated by the control amount vector y is indicated by the bounded closed set 'Y', and the bounded closed set 'C' is expressed by the following equation 8. Furthermore, when the internal state vector x is the m-dimensional vector, the operation amount vector u is the n-dimensional vector, the control amount vector y is the p-dimensional vector, and q=m+n+p, the bounded closed set C is included in the vector space $R^q$.

$$C = U \times X \times Y \subseteq R^q \quad (8)$$

Then, when the subject restraining signal vector c is included in the bounded closed set C, the internal state vector x is included in the bounded closed set X, the operation amount vector u is included in the bounded closed set U, and the control amount vector y is included in the bounded closed set Y. Accordingly, when the operation amount vector u (that is, each operation amount) is corrected so that the subject restraining signal vector c is included in the bounded closed set C, and the operation amount in accordance with the corrected operation amount vector u is input to each control object, the control amount of each control object is controlled so as to satisfy all of the constraint related to the internal state of each control object, the constraint related to the operation amount input to each control object, and the constraint related to the control amount output from each control object.

With the above-described condition, when it is assumed that the following error integration control is performed based on the internal state feedback obtained by the estimation of the internal states of plural constituents of the internal combustion engine including the vane 35d, the vane actuator 35e, the EGR control valve 52, and the EGR control valve actuator, the deviation of the actual supercharging pressure with respect to the target supercharging pressure (that is, the supercharging pressure deviation), and the deviation of the actual EGR ratio with respect to the target EGR ratio (that is, the EGR ratio deviation), the target supercharging pressure and the target EGR ratio respectively determined from the maps of FIGS. 3(A) and 3(B) are corrected as below, and the target supercharging pressure and the target EGR ratio to be used to determine the operation amounts respectively input to the vane 35d and the EGR control valve 52 are obtained.

That is, when the feedback gain related to the internal state feedback is indicated by '$K_x$', the feedback gain related to the following error integration control is indicated by '$K_v$', the internal state vector indicating the internal states of plural constituents of the internal combustion engine is indicated by 'x', the following error integration value vector indicating the following error integration value in the following error integration control is indicated by 'v', and the operation amount vector indicating the operation amount input from the vane actuator 35e to the vane 35 and the operation amount input from the EGR control valve actuator to the EGR control valve 52 is indicated by 'u', the operation amount vector u is expressed by the following equation 9.

$$u = K_x x + K_v v \quad (9)$$

Further, when the target value vector indicating the target supercharging pressure and the target EGR ratio is indicated by 'r', the control amount vector indicating the supercharging pressure and the EGR ratio as the control amount of the control object is indicated by 'y', and the following error vector indicating the deviation of the actual supercharging pressure with respect to the target supercharging pressure (that is, the following error) and the deviation of the actual EGR ratio with respect to the target EGR ratio (that is, the following error) is indicated by 'e', the following error vector e is expressed by the following equation 10.

$$e = r - y \quad (10)$$

Furthermore, when the following error integration value vector at the current time is indicated by 'v' and the following error integration value vector at the next time is indicated by '$v^+$', the following error integration value vector $v^+$ at the next time is expressed by the following equation 11.

$$v^+ = v + e \quad (11)$$

Then, when the above-described equation 10 and the above-described equation 11 are transformed through the application to the above-described equation 1, the above-described equation 2, and the above-described equation 7, the closed loop system state space model of the following equation 12 to the following equation 14 may be obtained.

$$\begin{bmatrix} v^+ \\ x^+ \end{bmatrix} = \begin{bmatrix} -DK_v & -(C+DK_x) \\ BK_v & A+BK_x \end{bmatrix} \begin{bmatrix} v \\ x \end{bmatrix} + \begin{bmatrix} I \\ 0 \end{bmatrix} r \quad (12)$$

$$y = [DK_v \quad C+DK_x] \begin{bmatrix} v \\ x \end{bmatrix} \quad (13)$$

$$c = [D_c K_v \quad C+D_c K_x] \begin{bmatrix} v \\ x \end{bmatrix} \quad (14)$$

Here, the above-described equation 12 is an equation which obtains the following error integration value at the next time (which is indicated by the following error integration value vector $v^+$) and the internal state at the next time of the constituent of the internal combustion engine (which is indicated by the internal state vector $x^+$) based on the following error integration value at the current time of the supercharging pressure and the EGR ratio (which is indicated by the following error integration value vector v), the internal state at the current time of the constituent of the internal combustion engine (which is indicated by the internal state vector x), and the target supercharging pressure and the target EGR ratio at the current time (which is indicated by the target value vector r).

Further, the above-described equation 13 is an equation which obtains the supercharging pressure and the EGR ratio as the control amount of the control object (which is indicated by the control amount vector y) based on the following error integration value of the supercharging pressure and the EGR ratio and the internal state of the constituent of the internal combustion engine.

Furthermore, the above-described equation 14 is an equation which obtains the above-described subject restraining signal vector c based on the following error integration value of the supercharging pressure and the EGR ratio and the internal state of the constituent of the internal combustion engine.

On the other hand, 'ξ', 'Φ', 'G', 'H', and 'Hc' are respectively defined as the following equation 15 to the following equation 19.

$$\xi = \begin{bmatrix} v \\ x \end{bmatrix} \quad (15)$$

$$\Phi = \begin{bmatrix} -DK_v & -(C+DK_x) \\ BK_v & A+BK_x \end{bmatrix} \quad (16)$$

$$G = \begin{bmatrix} I \\ 0 \end{bmatrix} \quad (17)$$

$$H = [DK_v \quad C+DK_x] \quad (18)$$

$$H_c = [D_cK_v \quad C+D_cK_x] \quad (19)$$

Then, when 'ξ', 'Φ', 'G', 'H', and 'Hc' described above are used, the above-described equation 12 to the above-described equation 14 may be expressed as the following equation 20 to the following equation 22.

$$\xi^+ = \Phi\xi + Gr \quad (20)$$

$$y = H\xi \quad (21)$$

$$c = H_c\xi \quad (22)$$

Then, when the calculation cycle is referred to as 'step' and the target supercharging pressure and the target EGR ratio are given as the target value vector r, the subject restraining signal vector c before step h is calculated as the following equation 23 from the above-described equation 20 to the above-described equation 22.

$$\bar{c}(h,x,r) = H_c(\Phi^c\xi + \Sigma_{i=0}^{h-1}\Phi^{h-i-1}Gr) \quad (23)$$

Here, when the subject restraining signal vector c calculated in accordance with the above-described equation 23 is included in the bounded closed set C, it may be understood that the target supercharging pressure and the target EGR ratio at that time satisfy the constraint. Accordingly, when the target supercharging pressure and the target EGR ratio respectively determined from the maps of FIGS. 3(A) and 3(B) are corrected so that the subject restraining signal vector c calculated in accordance with the above-described equation 23 is included in the bounded closed set C, and the corrected target supercharging pressure and the corrected target EGR ratio are used in the control of the supercharging pressure and the EGR ratio, the supercharging pressure and the EGR ratio may be controlled in a state where all constraints are satisfied.

Accordingly, in the control of the supercharging pressure and the EGR ratio, since the time before the limited time, that is, the time before limited step h may be considered, when the initial target value vector indicating the target supercharging pressure and the target EGR ratio respectively determined from the maps of FIGS. 3(A) and 3(B), that is, the initial target value is indicated by '$r_0$' under the constraint in which the subject constraint signal c is included in the bounded closed set C, the target supercharging pressure and the target EGR ratio may be obtained which control the supercharging pressure and the EGR ratio in a state where the target supercharging pressure and the target EGR ratio indicated by the target value vector r obtained by solving the optimal problem illustrated in the following (24) in which the minimum value of the absolute value of the deviation of the target value vector r indicating the target supercharging pressure and the target EGR ratio to be obtained at this time with respect to the initial target value vector $r_0$ is obtained satisfy all of the constraints.

minimize $//r_0 - r//$ subject to $\bar{c}(i,x(k),r) \in C$     (24)

i=0, 1, . . . , h

That is, when the target supercharging pressure and the target EGR ratio obtained by sequentially solving the optimal problem illustrated in the above (24) are used in the control of the supercharging pressure and the EGR ratio, the supercharging pressure and the EGR ratio are controlled in a state where all constraints are satisfied.

Furthermore, in the example introduced above, the target supercharging pressure and the target EGR ratio respectively determined from the maps of FIGS. 3(A) and 3(B) are corrected so that all constraint conditions are satisfied by using the state space model, and the corrected target supercharging pressure and the corrected target EGR ratio are used in the control of the actual supercharging pressure and the actual EGR ratio. Accordingly, in the example introduced above, the supercharging pressure, the EGR ratio, the operation state of the vane, the operation state of the EGR control valve, the vane operation amount, the EGR control valve operation amount, the operation state of the vane actuator, and the operation state of the EGR control valve actuator when controlling the actual supercharging pressure and the actual EGR ratio based on the target supercharging pressure and the target EGR ratio respectively determined from the maps of FIGS. 3(A) and 3(B) are estimated by the state space model, it is determined whether all constraint conditions are satisfied based on the estimation result, the target supercharging pressure and the target EGR ratio are corrected until it is determined that all constraint conditions are satisfied, and the target supercharging pressure and the target EGR ratio when it is determined that all constraint conditions are satisfied are used in the control of the actual supercharging pressure and the actual EGR ratio.

According to this, when the target supercharging pressure is changed or the target EGR ratio is changed, the optimal target supercharging pressure or the optimal target EGR ratio is sequentially calculated during a process in which control is performed so that the supercharging pressure or the EGR ratio becomes the target supercharging pressure or the target EGR ratio (that is, the transient state), and the supercharging pressure or the EGR ratio is controlled based on the calculated target supercharging pressure or the calculated target EGR ratio. For this reason, the satisfactory response in the supercharging pressure or the EGR ratio in the transient state is obtained.

In particular, according to this, since there is also a constraint applied to the operation amount input to the vane 35d and the EGR control valve 52, the antiwindup effect is obtained. For this reason, the control response of the supercharging pressure and the EGR ratio is more satisfactory during a process in which control is performed so that the supercharging pressure and the EGR ratio respectively become the target supercharging pressure and the target EGR ratio (that is, the transient state).

Further, in the embodiment described above and the example introduced above, the supercharging pressure and the EGR ratio are controlled in a state where the constraint related to the control objects as the vane of the supercharger and the EGR control valve of the EGR device and the constraint related to the actuator controlling the operation of the control objects as the vane actuator and the EGR control valve actuator are satisfied. For this reason, it may be understood that the safety and the robustness of the control of the supercharging pressure and the EGR ratio are high.

Further, in the state space model described based on the above-described concept, the non-linear characteristic of the input to the control object and the output from the control object, the constraint for the input and the output, and the constraint related to the internal state of the control object may be explicitly described. For this reason, it may be understood that the safety and the robustness of the control are high in the control of the supercharging pressure and the EGR ratio used in the state space model.

Furthermore, the optimal solution may be obtained when solving the optimal problem of the above-described equation 24, but the approximate solution may be obtained when the time taken for once calculation is comparatively short or the solution needs to be promptly obtained.

Further, in the example introduced above, the internal state feedback is performed by the estimation of the internal state of the constituent of the internal combustion engine including the vane, the vane actuator, the EGR control valve, and the EGR control valve actuator, but when the estimation of the internal state of the constituent of the internal combustion engine may not be performed or may not be performed with high precision, the output feedback may be used based on the output value from the control objects as the supercharging pressure and the EGR ratio instead of the internal state feedback.

Furthermore, while an embodiment of the invention has been described by exemplifying a case where the control device of the invention is applied to the compression ignition type internal combustion engine as described above, the invention may also be applied to the spark ignition type internal combustion engine.

Figure 4:
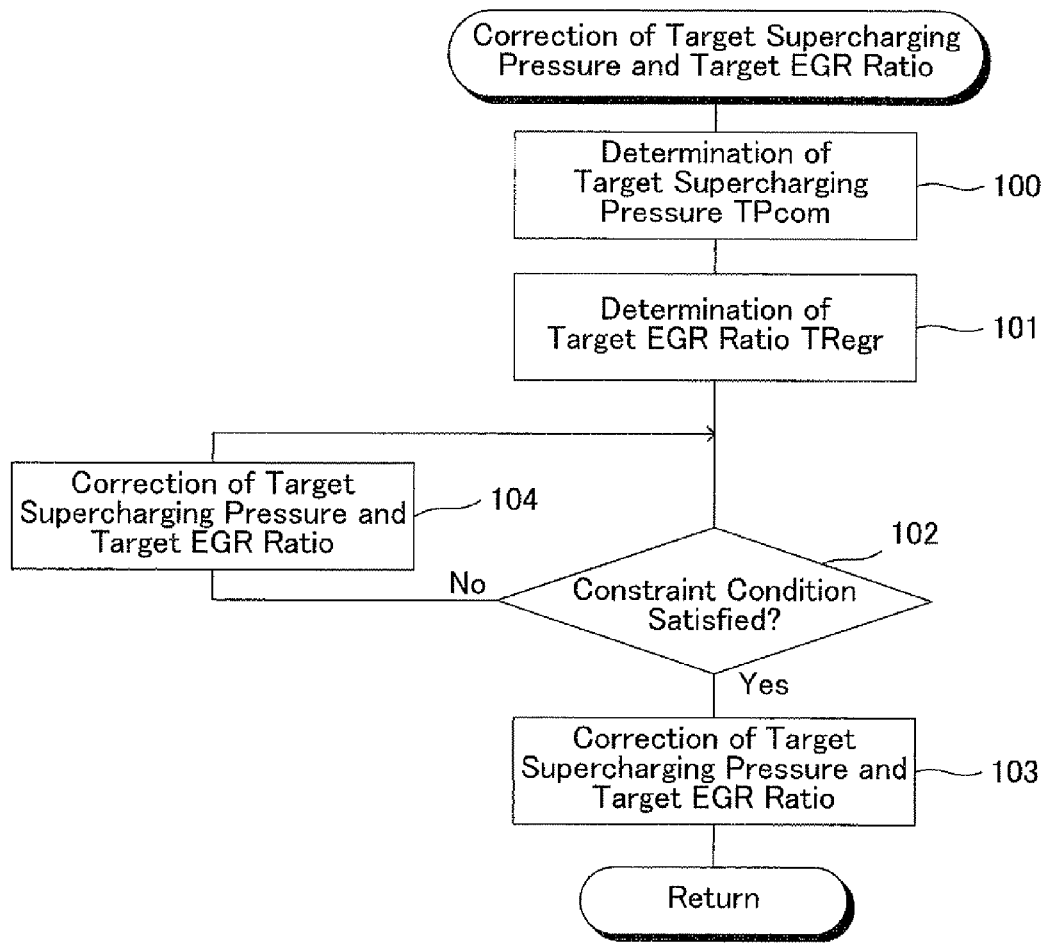
FIG. 4 is a diagram illustrating a flowchart in which the target supercharging pressure and the target EGR ratio are corrected according to an embodiment of the invention.

Finally, an example of a routine which corrects the target supercharging pressure and the target EGR ratio will be introduced according to the above-described example. This example is illustrated in FIG. 4. The routine of FIG. 4 is performed at a predetermined time interval.

When the routine of FIG. 4 is started, first, in step 100, the target supercharging pressure TPcom is determined based on the engine rotation speed N and the engine load L from the map of FIG. 3(A). Subsequently, in step 101, the target EGR ratio TRegr is determined based on the engine rotation speed N and the engine load L from the map of FIG. 3(B).

Subsequently, in step 102, it is determined whether the above-described constraints are all satisfied when the control of the supercharging pressure and the EGR ratio is performed based on the target supercharging pressure and the target EGR ratio determined in step 100. Here, when it is determined that the above-described constraints are all satisfied, the routine proceeds to step 103, and the target supercharging pressure determined in step 100 is set as the target supercharging pressure used in the control of the actual supercharging pressure. Also, the target EGR ratio determined in step 101 is set as the target EGR ratio used in the control of the actual EGR ratio, and the routine is ended.

On the other hand, in step 102, when it is determined that at least one of the above-described constraint conditions is not satisfied, the routine proceeds to step 104, the target supercharging pressure determined in step 100 and the target EGR ratio determined in step 101 are corrected according to the above-described method, and the routine proceeds to step 102 again. Then, in this case, in step 102, it is determined whether the above-described constraints are all satisfied when the control of the supercharging pressure and the EGR ratio is performed based on the corrected target supercharging pressure and the corrected target EGR ratio in step 104. Here, when it is determined that the above-described constraints are all satisfied, the routine proceeds to step 103, and the corrected target supercharging pressure is set as the target supercharging pressure used in the control of the actual supercharging pressure in step 104. Also, the corrected target EGR ratio is set as the target EGR ratio used in the control of the actual supercharging pressure in step 104.

On the other hand, in step 102, when it is determined that at least one of the above-described constraint conditions is not satisfied, the routine proceeds to step 104 again, the target supercharging pressure and the target EGR ratio corrected in precedent step 104 are further corrected according to the above-described method, and the routine proceeds to step 102 again. That is, step 104 and step 102 are repeated until it is determined that the above-described constraint conditions are all satisfied in step 102.

The invention claimed is:

1. A control device for an internal combustion engine comprising:

an initial target value determination means for determining a target value of a control amount of a first control object of an internal combustion engine as a first initial target value and determining a target value of a control amount of a second control object of the internal combustion engine as a second initial target value;

an operation amount determination means for determining a first operation amount to be input to the first control object in accordance with a first control target value as a target value for controlling the control amount of the first control object and determining a second operation amount to be input to the second control object in accordance with a second control target value as a target value for controlling the control amount of the second control object;

a first operation control means for controlling the operation of the first control object in accordance with the first operation amount determined by the operation amount determination means;

a second operation control means for controlling the operation of the second control object in accordance with the second operation amount determined by the operation amount determination means;

a correction target value output means for correcting the first initial target value and the second initial target value in accordance with a predetermined rule and outputting the respective corrected initial target values as a first correction target value and a second correction target value; and an estimation means for estimating the state of the internal combustion engine when the control amount of each of the control objects is controlled in accordance with the first operation amount and the second operation amount determined by the operation amount determination means by using the first initial target value and the second initial target value respectively as the first control target value and the second control target value, wherein:

the first initial target value and the second initial target value are corrected by the correction target value output means so that the constraint condition is satisfied based on the state of the internal combustion engine estimated by the estimation means, each of the operation control means controls the operation of the corresponding control object, thereby the control amount of each of the control objects is controlled, in the case where a constraint condition related to the internal combustion engine is satisfied when the control amount of the first control object and the control amount of the second control object are controlled in accordance with the first operation amount and the second operation amount determined by the operation amount determination means by using the first initial target value and the second initial target value respectively as the first control target value and the second control target value, the first initial target value and the second initial target value are respectively input as the first control target value and the second control target value to the operation amount determination means, and in the case where a constraint condition related to the internal combustion engine is not satisfied when the control amount of the first control object and the control amount of the second control object are controlled in accordance with the first operation amount and the second operation amount determined by the operation amount determination means by using the first initial target value and the second initial target value respectively as the first control target value and the second control target value, the first initial target value and the second initial target value are repeatedly corrected in accordance with the predetermined rule by the correction target value output means so as to satisfy the constraint condition, the corrected initial target values are respectively output as a first correction target value and a second correction target value, and the first correction target value and the second correction target value output therefrom are respectively input as the first control target value and the second control target value to the operation amount determination means.

2. The control device for the internal combustion engine according to claim 1, wherein the estimation means estimates the state of the internal combustion engine when the control amount of each of the control objects is controlled in accordance with the first operation amount and the second operation amount determined by the operation amount determination means by using the first initial target value and the second initial target value respectively as the first control target value and the second control target value by a state space model related to the internal combustion engine.

3. The control device for the internal combustion engine according to claim 1, wherein the constraint condition is indicated by a bounded closed set, the internal state of the internal combustion engine related to the constraint condition is indicated by a vector, and it is determined that the constraint condition is satisfied when the vector is included in the bounded closed set.

4. The control device for the internal combustion engine according to claim 1, wherein the first initial target value and the second initial target value are corrected by the correction target value output means so that the first correction target value becomes a value closest to the first initial target value and the second correction target value becomes a value closest to the second initial target value.

5. The control device for the internal combustion engine according to claim 1, wherein the constraint condition includes:

at least one of a constraint condition related to the control amount of the first control object, a constraint condition related to the first control object, a constraint condition related to the first operation amount to be input to the first control object, and a constraint condition related to the first operation control means; and at least one of a constraint condition related to the control amount of the second control object, a constraint condition related to the second control object, a constraint condition related to the second operation amount to be input to the second control object, and a constraint condition related to the second operation control means.

6. The control device for the internal combustion engine according to claim 5, wherein the constraint condition related to the control amount of the first control object is that the control amount of the first control object is in a predetermined allowable range, the constraint condition related to the first control object is that the operation state of the first control object is in a predetermined allowable range, the constraint condition related to the first operation amount to be input to the first control object is that the first operation amount is in a predetermined allowable range, the constraint condition related to the first operation control means is that the operation state of the first operation control means is in a predetermined allowable range, the constraint condition related to the control amount of the second control object is that the control amount of the second control object is in a predetermined allowable range, the constraint condition related to the second control object is that the operation state of the second control object is in a predetermined allowable range, the constraint condition related to the second operation amount to be input to the second control object is that the second operation amount is in a predetermined allowable range, and the constraint condition related to the second operation control means is that the operation state of the second operation control means is in a predetermined allowable range.

7. The control device for the internal combustion engine according to claim 5, wherein the first initial target value and the second initial target value are corrected by the correction target value output means so as to satisfy all of: the constraint condition related to the control amount of the first control object; the constraint condition related to the first control object; the constraint condition related to the first operation amount to be input to the first control object; the constraint condition related to the first operation control means; the constraint condition related to the control amount of the second control object; the constraint condition related to the second control object; the constraint condition related to the second operation amount to be input to the second control object; and the constraint condition related to the second operation control means.

8. The control device for the internal combustion engine according to claim 1, wherein the first control object is a pressure control valve which controls a degree of increase in a pressure of air brought into a combustion chamber in a supercharger which increases the pressure of the air brought into the combustion chamber of the internal combustion engine, the second control object is an exhaust gas amount control valve which controls an amount of an exhaust gas introduced into an air intake passage in an exhaust recycling device which introduces the exhaust gas discharged from the combustion chamber into the air intake passage of the internal combustion engine so that the exhaust gas discharged from the combustion chamber is brought into the combustion chamber, the control amount of the first control object is the pressure of the air brought into the combustion chamber, the control amount of the second control object is the amount of the exhaust gas introduced into the air intake passage, the first operation control means is a pressure control valve actuator which controls the operation of the pressure control valve, and the second operation control means is an exhaust gas amount control valve actuator which controls the operation of the exhaust gas amount control valve.

9. A control device for an internal combustion engine comprising:

a first control object to be controlled in the internal combustion engine;

a first operation control means for controlling the operation of the first control object;

a second control object to be controlled in the internal combustion engine;

a second operation control means for controlling the operation of the second control object;

a control signal generation means for generating a first control signal enabling the first operation control means to control the operation of the first control object and generating a second control signal enabling the second operation control means to control the operation of the second control object, the control signal generation means generating the first control signal in such a manner that a target value for controlling the control amount of the first control object is input as a first control target value and the input first control target value is transformed in accordance with a predetermined first transformation rule and generating the second control signal in such a manner that a target value for the control of the control amount of the second control object is input as a second control target value and the input second control target value is transformed in accordance with a predetermined second transformation rule;

an initial target value determination means for determining a target value of the control amount of the first control object as a first initial target value based on a predetermined condition and determining a target value of the control amount of the second control object as a second initial target value based on a predetermined condition;

a correction target value output means for correcting the first initial target value and the second initial target value determined by the initial target value determination means in accordance with a predetermined rule and outputting the respective corrected initial target values as a first correction target value and a second correction target value; and an estimation means for estimating the state of the internal combustion engine when the control amount of each of the control objects is controlled in accordance with the first control signal and the second control signal generated by the control signal generation means by using the first initial target value and the second initial target value respectively as the first control target value and the second control target value, wherein:

the first initial target value and the second initial target value are corrected by the correction target value output means so that the constraint condition is satisfied based on the state of the internal combustion engine estimated by the estimation means, each of the operation control means controls the operation of the corresponding control object, thereby the control amount of each of the control objects is controlled, in the case where a constraint condition related to the internal combustion engine is satisfied when the control amount of the first control object and the control amount of the second control object are controlled in accordance with the first control signal and the second control signal generated by the control signal generation means by using the first initial target value and the second initial target value respectively as the first control target value and the second control target value, the first initial target value and the second initial target value are respectively input as the first control target value and the second control target value to the control signal generation means, and in the case where a constraint condition related to the internal combustion engine is not satisfied when the control amount of the first control object and the control amount of the second control object are controlled in accordance with the first control signal and the second control signal generated by the control signal generation means by using the first initial target value and the second initial target value respectively as the first control target value and the second control target value, the first initial target value and the second initial target value are repeatedly corrected in accordance with the predetermined rule by the correction target value output means so as to satisfy the constraint condition, the respective corrected initial target values are output as the first correction target value and the second correction target value, and the first correction target value and the second correction target value output therefrom are respectively input as the first control target value and the second control target value to the control signal generation means.

10. The control device for the internal combustion engine according to claim 9, wherein the estimation means estimates the state of the internal combustion engine when the control amount of each of the control objects is controlled in accordance with the first control signal and the second control signal generated by the control signal generation means by using the first initial target value and the second initial target value respectively as the first control target value and the second control target value by a state space model related to the internal combustion engine.

11. The control device for the internal combustion engine according to claim 9,
wherein the constraint condition is indicated by a bounded closed set,
the internal state of the internal combustion engine related to the constraint condition is indicated by a vector, and
it is determined that the constraint condition is satisfied when the vector is included in the bounded closed set.

12. The control device for the internal combustion engine according to claim 9,
wherein the first initial target value and the second initial target value are corrected by the correction target value output means so that the first correction target value becomes a value closest to the first initial target value and the second correction target value becomes a value closest to the second initial target value.

13. The control device for the internal combustion engine according to claim 9,
wherein the constraint condition includes:
at least one of a constraint condition related to the control amount of the first control object, a constraint condition related to the first control object, a constraint condition related to the first operation control means, and a constraint condition related to the first control signal given to the first operation control means; and
at least one of a constraint condition related to the control amount of the second control object, a constraint condition related to the second control object, a constraint condition related to the second operation control means, and a constraint condition related to the second control signal given to the second operation control means.

14. The control device for the internal combustion engine according to claim 13,
wherein the constraint condition related to the control amount of the first control object is that the control amount of the first control object is in a predetermined allowable range,
the constraint condition related to the first control object is that the operation state of the first control object is in a predetermined allowable range,
the constraint condition related to the first operation control means is that the operation state of the first operation control means is in a predetermined allowable range,
the constraint condition related to the first control signal given to the first operation control means is that the first control signal is in a predetermined allowable range,
the constraint condition related to the control amount of the second control object is that the control amount of the second control object is in a predetermined allowable range,
the constraint condition related to the second control object is that the operation state of the second control object is in a predetermined allowable range,
the constraint condition related to the second operation control means is that the operation state of the second operation control means is in a predetermined allowable range, and
the constraint condition related to the second control signal given to the second operation control means is that the second control signal is in a predetermined allowable range.

15. The control device for the internal combustion engine according to claim 13,
wherein the first initial target value and the second initial target value are corrected by the correction target value output means so as to satisfy all of: the constraint condition related to the control amount of the first control object; the constraint condition related to the first control object; the constraint condition related to the first operation control means; the constraint condition related to the first control signal given to the first operation control means; the constraint condition related to the control amount of the second control object; the constraint condition related to the second control object; the constraint condition related to the second operation control means; and the constraint condition related to the second control signal given to the second operation control means.

16. The control device for the internal combustion engine according to claim 9,
wherein the first control object is a pressure control valve which controls a degree of increase in a pressure of air brought into a combustion chamber in a supercharger which increases the pressure of the air brought into the combustion chamber of the internal combustion engine,
the second control object is an exhaust gas amount control valve which controls an amount of an exhaust gas introduced into an air intake passage in an exhaust recycling device which introduces the exhaust gas discharged from the combustion chamber into the air intake passage of the internal combustion engine so that the exhaust gas discharged from the combustion chamber is brought into the combustion chamber,
the control amount of the first control object is the pressure of the air brought into the combustion chamber,
the control amount of the second control object is the amount of the exhaust gas introduced into the air intake passage,
the first operation control means is a pressure control valve actuator which controls the operation of the pressure control valve, and
the second operation control means is an exhaust gas amount control valve actuator which controls the operation of the exhaust gas amount control valve.

17. A control device for an internal combustion engine comprising:
a control process execution means for executing a control process in which a target value for controlling a control amount of a first control object of the internal combustion engine is input as a first control target value, a first operation amount to be input to the first control object in accordance with the input first control target value is determined, a target value for controlling a control amount of a second control object of the internal combustion engine is input as a second control target value, and a second operation amount to be input to the second control object in accordance with the input second control target value is determined,
an initial target value determination means for determining the target value of the control amount of the first control object as a first initial target value and determining the target value of the control amount of the second control object as a second initial target value;
a first determination means for determining whether a constraint condition related to the internal combustion engine is satisfied when the first operation amount determined by the control process execution means by using the first initial target value determined by the initial target value determination means as the first control target value is input to the first control object and the second operation amount determined by the control process execution means by using the second initial target value determined by the initial target value determination means as the second control target value is input to the second control object;

an initial target value input means for inputting the first initial target value and the second initial target value as the first control target value and the second control target value to the control process execution means when it is determined that the constraint condition is satisfied by the first determination means;

a correction target value output means for correcting the first initial target value and the second initial target value in accordance with a predetermined rule when it is determined that the constraint condition is not satisfied by the first determination means and outputting the respective corrected initial target values as a first correction target value and a second correction target value;

a second determination means for determining whether the constraint condition is satisfied when a first operation amount determined by the control process execution means by using the first correction target value output from the correction target value output means as the first control target value is input to the first control object and a second operation amount determined by the control process execution means by using the second correction target value as the second control target value is input to the second control object; and a correction target value input means for inputting the first correction target value and the second correction target value as the first control target value and the second control target value to the control process execution means when it is determined that the constraint condition is satisfied by the second determination means, wherein:

the control amount of the first control object is controlled by controlling the operation of the first control object in accordance with the first operation amount determined by the control process execution means, the control amount of the second control object is controlled by controlling the operation of the second control object in accordance with the second operation amount determined by the control process execution means, when it is determined that the constraint condition is not satisfied by the second determination means, the first correction target value and the second correction target value are further corrected in accordance with the predetermined rule by the correction target value output means, the further corrected correction target values are output as a new first correction target value and a new second correction target value, it is determined whether the constraint condition is satisfied by the second determination means when the first operation amount determined by the control process execution means by using the output new first correction target value as the first control target value is input to the first control object and the second operation amount determined by the control process execution means by using the output new second correction target value as the second control target value is input to the second control object, and the correction of the first correction target value and the second correction target value and the output of the corrected first correction target value and the corrected second correction target value are repeatedly performed by the correction target value output means until it is determined that the constraint condition is satisfied by the second determination means.

18. The control device for the internal combustion engine according to claim 17, further comprising:

an estimation means for estimating the state of the internal combustion engine when the control amount of each of the control objects is controlled in accordance with the operation amount determined by the control process execution means by using the first initial target value and the second initial target value or the first correction target value and the second correction target value respectively as the first control target value and the second control target value, wherein it is determined whether the constraint condition is satisfied by the first determination means or the second determination means based on the state of the internal combustion engine estimated by the estimation means.

19. The control device for the internal combustion engine according to claim 18, wherein the estimation means estimates the state of the internal combustion engine when the control amount of each of the control objects is controlled in accordance with the first operation amount and the second operation amount determined by the control process execution means by using the first initial target value and the second initial target value or the first correction target value and the second correction target value respectively as the first control target value and the second control target value by a state space model related to the internal combustion engine.

20. The control device for the internal combustion engine according to claim 17, wherein the constraint condition is indicated by a bounded closed set, the internal state of the internal combustion engine related to the constraint condition is indicated by a vector, and it is determined that the constraint condition is satisfied when the vector is included in the bounded closed set.

21. The control device for the internal combustion engine according to claim 17, wherein the first initial target value and the second initial target value or the first correction target value and the second correction target value are corrected by the correction target value output means so that the first correction target value becomes a value closest to the first initial target value and the second correction target value becomes a value closest to the second initial target value.

22. The control device for the internal combustion engine according to claim 17, further comprising:

a first operation control means for controlling the operation of the first control object;

a second operation control means for controlling the operation of the second control object; and a control signal generation means for generating a first control signal enabling the first operation control means to control the operation of the first control object and generating a second control signal enabling the second operation control means to control the operation of the second control object, the control signal generation means generating the first control signal in such a manner that the first control target value is input and the input first control target value is transformed in accordance with a predetermined first transformation rule and generating the second control signal in such a manner that the second control target value is input and the input second control target value is transformed in accordance with a predetermined second transformation rule, wherein:

the first operation control means controls the operation of the first control object by inputting the first operation amount determined by the control process execution means in accordance with the first control signal generated by the control signal generation means to the first control object, the second operation control means controls the operation of the second control object by inputting the second operation amount determined by the control process execution means in accordance with the second control signal generated by the control signal generation means to the second control object, and the constraint condition includes:

at least one of a constraint condition related to the control amount of the first control object, a constraint condition related to the first control object, a constraint condition related to the first operation amount to be input to the first control object, a constraint condition related to the first operation control means, and a constraint condition related to the first control signal given to the first operation control means; and at least one of a constraint condition related to the control amount of the second control object, a constraint condition related to the second control object, a constraint condition related to the second operation amount to be input to the second control object, a constraint condition related to the second operation control means, and a constraint condition related to the second control signal given to the second operation control means.

23. The control device for the internal combustion engine according to claim 22, wherein the constraint condition related to the control amount of the first control object is that the control amount of the first control object is in a predetermined allowable range, the constraint condition related to the first control object is that the operation state of the first control object is in a predetermined allowable range, the constraint condition related to the first operation amount to be input to the first control object is that the first operation amount is in a predetermined allowable range, the constraint condition related to the first operation control means is that the operation state of the first operation control means is in a predetermined allowable range, the constraint condition related to the first control signal given to the first operation control means is that the first control signal is in a predetermined allowable range, the constraint condition related to the control amount of the second control object is that the control amount of the second control object is in a predetermined allowable range, the constraint condition related to the second control object is that the operation state of the second control object is in a predetermined allowable range, the constraint condition related to the second operation amount to be input to the second control object is that the second operation amount is in a predetermined allowable range, the constraint condition related to the second operation control means is that the operation state of the second operation control means is in a predetermined allowable range, and the constraint condition related to the second control signal given to the second operation control means is that the second control signal is in a predetermined allowable range.

24. The control device for the internal combustion engine according to claim 22, wherein the first initial target value and the second initial target value or the first correction target value and the second correction target value are corrected by the correction target value output means so as to satisfy all of: the constraint condition related to the control amount of the first control object; the constraint condition related to the first control object; the constraint condition related to the first operation amount to be input to the first control object; the constraint condition related to the first operation control means; the constraint condition related to the first control signal given to the first control object; the constraint condition related to the control amount of the second control object; the constraint condition related to the second control object; the constraint condition related to the second operation amount to be input to the second control object; the constraint condition related to the second operation control means; and the constraint condition related to the second control signal given to the second operation control means.

25. The control device for the internal combustion engine according to claim 17, wherein the first control object is a pressure control valve which controls a degree of increase in a pressure of air brought into a combustion chamber in a supercharger which increases the pressure of the air brought into the combustion chamber of the internal combustion engine, the second control object is an exhaust gas amount control valve which controls an amount of an exhaust gas introduced into an air intake passage in an exhaust recycling device which introduces the exhaust gas discharged from the combustion chamber into the air intake passage of the internal combustion engine so that the exhaust gas discharged from the combustion chamber is brought into the combustion chamber, the control amount of the first control object is the pressure of the air brought into the combustion chamber, the control amount of the second control object is the amount of the exhaust gas introduced into the air intake passage, the first operation control means is a pressure control valve actuator which controls the operation of the pressure control valve, and the second operation control means is an exhaust gas amount control valve actuator which controls the operation of the exhaust gas amount control valve.

26. A control device for an internal combustion engine comprising:

an initial target value determination means for determining a target value of a control amount of a first control object of an internal combustion engine as a first initial target value and determining a target value of a control amount of a second control object of the internal combustion engine as a second initial target value;

an operation amount determination means for determining a first operation amount to be input to the first control object in accordance with a first control target value as a target value for controlling the control amount of the first control object and determining a second operation amount to be input to the second control object in accordance with a second control target value as a target value for controlling the control amount of the second control object;

a first operation control means for controlling the operation of the first control object in accordance with the first operation amount determined by the operation amount determination means;

a second operation control means for controlling the operation of the second control object in accordance with the second operation amount determined by the operation amount determination means; and a correction target value output means for correcting the first initial target value and the second initial target value in accordance with a predetermined rule and outputting the respective corrected initial target values as a first correction target value and a second correction target value, wherein:

the constraint condition is indicated by a bounded closed set, the internal state of the internal combustion engine related to the constraint condition is indicated by a vector, it is determined that the constraint condition is satisfied when the vector is included in the bounded closed set, each of the operation control means controls the operation of the corresponding control object, thereby the control amount of each of the control objects is controlled, in the case where a constraint condition related to the internal combustion engine is satisfied when the control amount of the first control object and the control amount of the second control object are controlled in accordance with the first operation amount and the second operation amount determined by the operation amount determination means by using the first initial target value and the second initial target value respectively as the first control target value and the second control target value, the first initial target value and the second initial target value are respectively input as the first control target value and the second control target value to the operation amount determination means, and in the case where a constraint condition related to the internal combustion engine is not satisfied when the control amount of the first control object and the control amount of the second control object are controlled in accordance with the first operation amount and the second operation amount determined by the operation amount determination means by using the first initial target value and the second initial target value respectively as the first control target value and the second control target value, the first initial target value and the second initial target value are repeatedly corrected in accordance with the predetermined rule by the correction target value output means so as to satisfy the constraint condition, the corrected initial target values are respectively output as a first correction target value and a second correction target value, and the first correction target value and the second correction target value output therefrom are respectively input as the first control target value and the second control target value to the operation amount determination means.

27. A control device for an internal combustion engine comprising:

a first control object to be controlled in the internal combustion engine;

a first operation control means for controlling the operation of the first control object;

a second control object to be controlled in the internal combustion engine;

a second operation control means for controlling the operation of the second control object;

a control signal generation means for generating a first control signal enabling the first operation control means to control the operation of the first control object and generating a second control signal enabling the second operation control means to control the operation of the second control object, the control signal generation means generating the first control signal in such a manner that a target value for controlling the control amount of the first control object is input as a first control target value and the input first control target value is transformed in accordance with a predetermined first transformation rule and generating the second control signal in such a manner that a target value for the control of the control amount of the second control object is input as a second control target value and the input second control target value is transformed in accordance with a predetermined second transformation rule;

an initial target value determination means for determining a target value of the control amount of the first control object as a first initial target value based on a predetermined condition and determining a target value of the control amount of the second control object as a second initial target value based on a predetermined condition; and a correction target value output means for correcting the first initial target value and the second initial target value determined by the initial target value determination means in accordance with a predetermined rule and outputting the respective corrected initial target values as a first correction target value and a second correction target value, wherein:

each of the operation control means controls the operation of the corresponding control object, thereby the control amount of each of the control objects is controlled, the constraint condition is indicated by a bounded closed set, the internal state of the internal combustion engine related to the constraint condition is indicated by a vector, it is determined that the constraint condition is satisfied when the vector is included in the bounded closed set in the case where a constraint condition related to the internal combustion engine is satisfied when the control amount of the first control object and the control amount of the second control object are controlled in accordance with the first control signal and the second control signal generated by the control signal generation means by using the first initial target value and the second initial target value respectively as the first control target value and the second control target value, the first initial target value and the second initial target value are respectively input as the first control target value and the second control target value to the control signal generation means, and in the case where a constraint condition related to the internal combustion engine is not satisfied when the control amount of the first control object and the control amount of the second control object are controlled in accordance with the first control signal and the second control signal generated by the control signal generation means by using the first initial target value and the second initial target value respectively as the first control target value and the second control target value, the first initial target value and the second initial target value are repeatedly corrected in accordance with the predetermined rule by the correction target value output means so as to satisfy the constraint condition, the respective corrected initial target values are output as the first correction target value and the second correction target value, and the first correction target value and the second correction target value output therefrom are respectively input as the first control target value and the second control target value to the control signal generation means.

* * * * *